United States Patent
Hirose et al.

(10) Patent No.: US 11,269,922 B2
(45) Date of Patent: Mar. 8, 2022

(54) DATABASE SERVER, DATABASE MANAGEMENT METHOD, AND STORAGE MEDIUM

(71) Applicant: Kabushiki Kaisha Toshiba, Minato-ku (JP)

(72) Inventors: Shigeo Hirose, Kawasaki (JP); Mototaka Kanematsu, Yokohama (JP); Makoto Shimamura, Kawasaki (JP)

(73) Assignee: Kabushiki Kaisha Toshiba, Minato-ku (JP)

(*) Notice: Subject to any disclaimer, the term of this patent is extended or adjusted under 35 U.S.C. 154(b) by 0 days.

(21) Appl. No.: 16/082,771

(22) PCT Filed: Mar. 7, 2018

(86) PCT No.: PCT/JP2018/008667
§ 371 (c)(1),
(2) Date: Sep. 6, 2018

(87) PCT Pub. No.: WO2018/235348
PCT Pub. Date: Dec. 27, 2018

(65) Prior Publication Data
US 2020/0110760 A1    Apr. 9, 2020

(30) Foreign Application Priority Data
Jun. 20, 2017  (JP) .............................. JP2017-120318

(51) Int. Cl.
*G06F 16/27* (2019.01)
*G06F 11/20* (2006.01)

(52) U.S. Cl.
CPC ........ *G06F 16/273* (2019.01); *G06F 11/2082* (2013.01); *G06F 16/27* (2019.01); *G06F 16/275* (2019.01)

(58) Field of Classification Search
CPC ...... G06F 16/27; G06F 16/273; G06F 16/275; G06F 11/2082
(Continued)

(56) References Cited

U.S. PATENT DOCUMENTS 8,132,046 B2 * 3/2012 Varghese .............. G06F 16/273
                                                  714/6.23
9,239,767 B2 * 1/2016 Whynot .............. G06F 11/2097
(Continued)

FOREIGN PATENT DOCUMENTS

JP   2006-11848 A    1/2006
JP   2015-191451 A   11/2015

OTHER PUBLICATIONS

International Search Report dated May 1, 2018, in PCT/JP2018/008667, filed Mar. 7, 2018 (with English translation of categories of cited documents).

*Primary Examiner* — Phong H Nguyen
(74) *Attorney, Agent, or Firm* — Oblon, McClelland, Maier & Neustadt, L.L.P.

(57) ABSTRACT

A database server includes a database manager and a synchronization processing unit. When the database server is in a first state in which the database server receives requests from a client, the database manager updates a database in accordance with a request from the client and registers both update data for causing another database server included in the plurality of database servers to update a database of the other database server and management information of the update data for each data management unit in a memory on the basis of the request. When the database server is in the first state, the synchronization processing unit transmits the update data registered in the memory to the other database.

6 Claims, 21 Drawing Sheets

(58) Field of Classification Search
USPC .................................. 707/610, 613, 614, 615
See application file for complete search history.

(56) References Cited

U.S. PATENT DOCUMENTS

| | | | | |
|---|---|---|---|---|
| 10,282,433 | B1* | 5/2019 | Caruso | G06F 16/282 |
| 10,726,042 | B2* | 7/2020 | Chandra | G06F 16/27 |
| 2005/0289197 | A1* | 12/2005 | Kan | G06F 11/2097 |
| | | | | 707/999.204 |
| 2010/0161551 | A1* | 6/2010 | Whynot | G06F 16/275 |
| | | | | 707/610 |
| 2015/0278333 | A1* | 10/2015 | Hirose | G06F 16/283 |
| | | | | 707/607 |

* cited by examiner

FIG. 17
OCCURRENCE OF SO
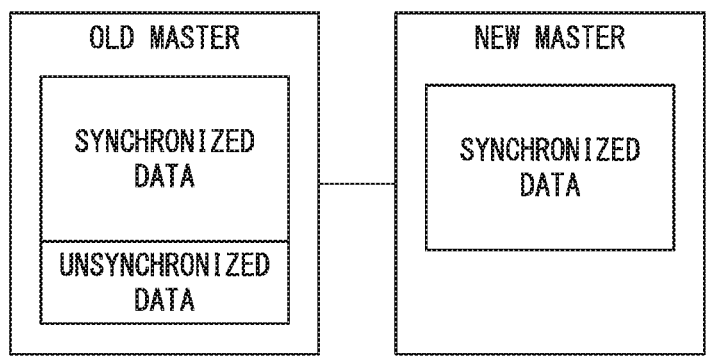
TRANSFER OF UNSYNCHRONIZED DATA
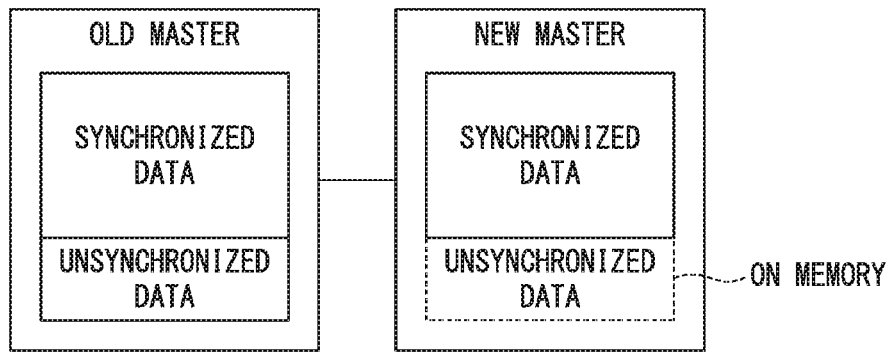
COMPLETION OF SO
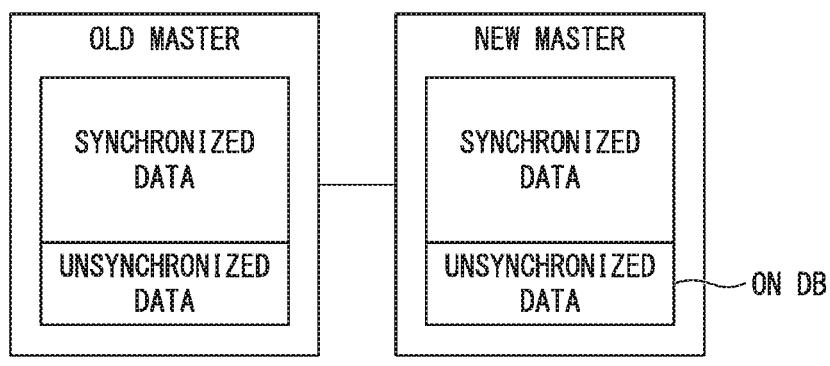

DATABASE SERVER, DATABASE MANAGEMENT METHOD, AND STORAGE MEDIUM

BACKGROUND OF THE INVENTION

Field of the Invention

Embodiments of the present invention relate to a database server, a database management method, and a storage medium.

Description of Related Art

A system that performs data replication is known in the related art (for example, see Japanese Unexamined Patent Application, First Publication No. 2017-81382). Replication is performed between a plurality of databases. In a database system having a plurality of databases, one database server may function as a master and another database server may function as a slave. The master receives a request from a client, updates its own database, and requests the slave database server to save a copy of data (data synchronization).

Here, in the database system, there are mainly have two operation patterns as operation patterns for notifying the client that processing based on the request has been completed. For example, there are an operation pattern for notifying the client after synchronization is completed in the slave (synchronous replication) and an operation pattern for performing synchronization at an arbitrary timing after notifying the client (asynchronous replication).

The relationship between the master and the slave may be switched on some occasions. Hereinafter, this operation is referred to as switchover. In the database system that performs asynchronous replication of the related art, there are cases where synchronization is not completed at the time of starting switchover and where switchover is not completed until synchronization is completed such that there occurs a period during which no requests can be received from the client. This may not apply to switching performed upon the occurrence of an abnormality such as equipment failure.

A system in which a first site and a second site are provided such that the second site can receive a write request or a read request to provide at least a part of the functionality of the system on behalf of or as an aid to the first site, and when performing processing based on the request, the second site performs the processing after necessary update information is acquired if latest data that is a target of the request is not yet held is known in connection with the above. However, also in this technology, if the latest data which is the target of the request is not yet held, the processing based on the request cannot be performed until necessary update information is acquired, which may cause delay of the response to the client.

SUMMARY OF THE INVENTION

An object to be achieved by the present invention is to provide a database server, a database management method, and a storage medium which can respond to a client more quickly when switchover is performed.

A database server of an embodiment is included in a database system. The database system has a plurality of database servers. The database server includes a database manager and a synchronization processing unit. When the database server is in a first state in which the database server receives requests from the client, the database manager updates a database in accordance with a request from a client and registers both update data for causing another database server included in the plurality of database servers to update a database of the other database server and management information of the update data for each data management unit in a memory on the basis of the request. When the database server is in the first state, the synchronization processing unit transmits the update data registered in the memory to the other database server. When the database server shifts from the first state to a second state in accordance with a role change instruction, the synchronization processing unit transmits the management information registered in the memory to the other database server. When the database server is in the second state, the synchronization processing unit transmits update data registered in the memory to the other database server. When the database server is in a third state to which the database server shifts from the second state, the synchronization processing unit updates the database on the basis of update data received from another database server included in the plurality of database servers.

BRIEF DESCRIPTION OF THE DRAWINGS

FIG. 17 is a diagram schematically showing a flow of processing performed in a database system of a comparative example when switchover is performed.

DETAILED DESCRIPTION OF THE INVENTION

Hereinafter, a database server, a database management method, and a storage medium of embodiments will be described with reference to the drawings.

[Overall Structure]

Figure 1:
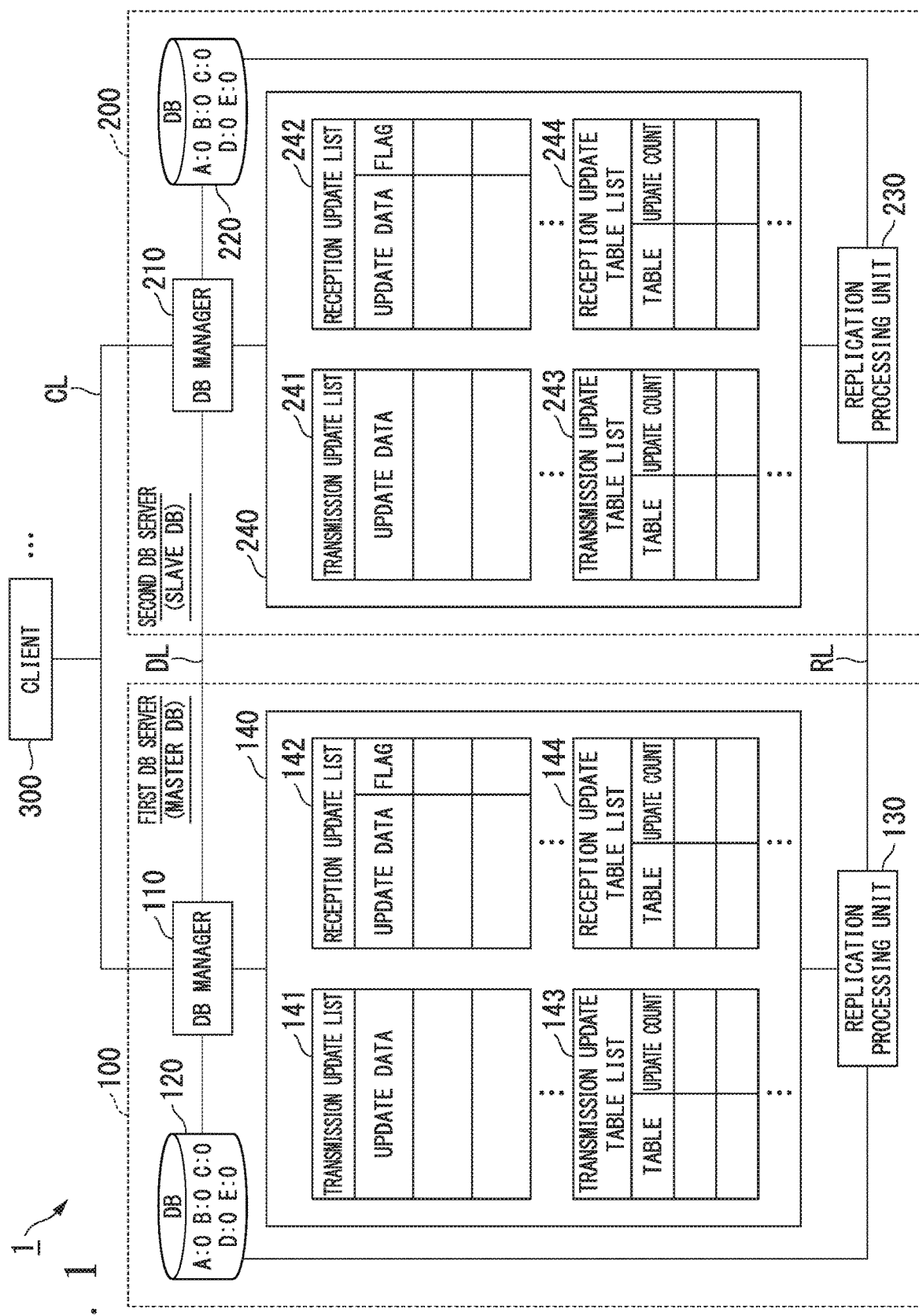
FIG. 1 is a configuration diagram of a database system 1 according to an embodiment.

FIG. 1 is a configuration diagram of a database system 1 according to an embodiment. The database system 1 is a system that manages databases stored in storage devices in accordance with a request from a client 300. The client 300 is, for example, any of various computer devices that transmit requests (in other words, commands) to the database system 1 via a network (not shown). The client 300 may be a management computer of a database system higher than the database system 1. The request is delivered, for example, by an SQL statement. In the embodiment, a communication path between the client 300 and the database system 1 is referred to and shown as a client link CL.

The database system 1 includes, for example, a first database (DB) server 100 and a second DB server 200. One of the first DB server 100 and the second DB server 200 operates as a master DB and the other operates as a slave DB. In the example of FIG. 1, the first DB server 100 operates as a master DB and the second DB server 200 operates as a slave DB. This relationship can be switched, for example, by outputting an instruction signal to an input unit of the database system 1 (not shown).

When the master DB receives a request from the client 300, the master DB first updates its own DB and returns a response to the client 300, and then transmits the same request to the slave DB at an arbitrary timing to synchronize the DB. That is, the database system 1 performs asynchronous replication.

For example, two links, a DB link DL and a replication link RL, are provided as communication paths between the master DB and the slave DB. These communication paths may be physically different communication paths, may be virtual communication paths using one communication line, or may be communication paths using wireless communication.

[First DB Server]

The first DB server 100 includes, for example, a DB manager 110, a DB 120, a replication processing unit 130, and an update list module 140. The DB manager 110 and the replication processing unit 130 are realized, for example, by a processor such as a central processing unit (CPU) executing a program (software). One or both of these may be realized by hardware (circuitry) such as a large scale integration (LSI), an application specific integrated circuit (ASIC), or a field-programmable gate array (FPGA) or may be realized by hardware and software in cooperation.

When the first DB server 100 is a master DB, the DB manager 110 functions as a window for the client 300. The DB manager 110 interprets a request from the client 300 and updates the DB 120 or reads data from the DB 120. The request for update includes requests for writing and deletion, which will hereinafter be collectively referred to as an update request. The DB manager 110 manages the DB 120 in predetermined data management units. The data management units can be referred to as tables, blocks, pages, records, or other terms, but in the present embodiment, data management units are described as tables. Also, for simplicity, it is assumed that five tables A, B, C, D, and E are set in each of the DBs 120 and 220. In addition, the DB manager 110 updates the update list module 140 as the DB 120 is updated.

The DB 120 is, for example, a database stored in one or more nonvolatile storage devices such as a hard disk drive (HDD), a flash memory, or a magnetoresistive memory.

When the first DB server 100 is a master DB, the replication processing unit 130 refers to the update list module 140 updated by the DB manager 110 and transmits the result of interpreting a request from the client 300 (or the request itself) to a replication processing unit 230 of the second DB server 200 via the replication link RL. At this time, the replication processing unit 130 updates the update list module 140. On the other hand, when the first DB server 100 is a slave DB, the replication processing unit 130 updates the DB 120 on the basis of information received from the replication processing unit 230 of the second DB server 200 via the replication link RL.

The update list module 140 is, for example, information stored in a memory such as a random access memory (RAM) or a flash memory. The update list module 140 may also be stored in the same storage device as that storing the DB 120. The update list module 140 includes, for example, a transmission update list 141, a reception update list 142, a transmission update table list 143, and a reception update table list 144.

Update data is registered in the transmission update list 141. The update data registered in the transmission update list 141 is data for which the DB 120 has been updated by the DB manager 110 and which has not yet been transmitted to the second DB server 200.

Update data and flags are registered in the reception update list 142. The update data registered in the reception update list 142 is data for which the DB 120 is to be subjected to update processing in the future. The flags will be described later.

Tables and update counts are registered in the transmission update table list 143. The tables registered in the transmission update table list 143 are tables which are to be updated by the update data registered in the transmission update list 141.

The update counts in the transmission update table list 143, the reception update table list 144, a transmission update table list 243, and a reception update table list 244 have different meanings in normal time and in switchover time. Here, switchover will be described. Switchover refers to switching the functions of the master DB and the slave DB, for example, in accordance with an external instruction or on the basis of internal logic. Such switching of the functions includes not only that of switchover but also that of failover performed urgently due to equipment failure, communication failure, or the like. Since the switchover is not caused by such an abnormality, it is necessary that a state prior to the switchover have been taken over at the completion of the switchover from the viewpoint of the client 300. Hereinafter, a period from the start to completion of the processing of switchover is referred to as a switchover time and the other period is referred to as a normal time.

In the normal time, an update count in the transmission update table list 143 represents the number of pieces of update data registered in the transmission update list 141 for a corresponding table. On the other hand, in the switchover time, the update count in the transmission update table list 143 is transmitted to the replication processing unit 230 at the start of the switchover and then reset by the replication processing unit 130.

Tables and update counts are registered in the reception update table list 144. The tables registered in the reception update table list 144 are tables which are to be updated by update data registered in a transmission update list 241 of the second DB server 200.

In the normal time, an update count in the reception update table list 144 represents the number of pieces of update data registered in the reception update list 142 for a corresponding table. In the switchover time, of update counts in the reception update table list 144, a count which has been received from the replication processing unit 230 at the start of the switchover is incremented by the DB manager 110 each time an update request relating to an unsynchronized table is received from the client 300 and is decremented by the replication processing unit 130 each time corresponding data is stored in the DB 120.

[Second DB Server]

The second DB server 200 includes, for example, a DB manager 210, the DB 220, the replication processing unit 230, and an update list module 240. The DB manager 210 and the replication processing unit 230 are realized, for example, by a processor such as a CPU executing a program (software). One or both of these may be realized by hardware (circuitry) such as an LSI, an ASIC, or an FPGA or may be realized by hardware and software in cooperation.

When the second DB server 200 is a master DB, the DB manager 210 functions as a window for the client 300. The DB manager 210 interprets a request from the client 300 and updates the DB 220 or reads data from the DB 220. The DB manager 210 manages the DB 220 in the same management units as in the first DB server 100. In addition, the DB manager 210 updates the update list module 240 as the DB 220 is updated.

The DB 220 is, for example, a database stored in one or more nonvolatile storage devices such as an HDD, a flash memory, or a magnetoresistive memory.

When the second DB server 200 is a master DB, the replication processing unit 230 refers to the update list module 240 updated by the DB manager 210 and transmits the result of interpreting a request from the client 300 (or the request itself) to the replication processing unit 130 of the first DB server 100 via the replication link RL. At this time, the replication processing unit 230 updates the update list module 240. On the other hand, when the second DB server 200 is a slave DB, the replication processing unit 230 updates the DB 220 on the basis of information received from the replication processing unit 130 of the first DB server 100 via the replication link RL.

The update list module 240 is, for example, information stored in a storage device such as a RAM or a flash memory. The update list module 240 may also be stored in the same storage device as that storing the DB 220. The update list module 240 includes, for example, the transmission update list 241, a reception update list 242, the transmission update table list 243, and the reception update table list 244.

Update data is registered in the transmission update list 241. The update data registered in the transmission update list 241 is data for which the DB 220 has been updated by the DB manager 210 and which has not yet been transmitted to the first DB server 100.

Update data and flags are registered in the reception update list 242. The update data registered in the reception update list 242 is data which has been received from the first DB server 100 but has not yet been subjected to update processing in the DB 220. The flags will be described later.

Tables and update counts are registered in the transmission update table list 243. The tables registered in the transmission update table list 243 are tables which are to be updated by the update data registered in the transmission update list 241.

In the normal time, an update count in the transmission update table list 243 represents the number of pieces of update data registered in the transmission update list 241 for a corresponding table. On the other hand, in the switchover time, the update count in the transmission update table list 243 is transmitted to the replication processing unit 130 at the start of the switchover and then reset by the replication processing unit 230.

Tables and update counts are registered in the reception update table list 244. The tables registered in the reception update table list 244 are tables which are to be updated by update data registered in the transmission update list 141 of the first DB server 100.

In the normal time, an update count in the reception update table list 244 represents the number of pieces of update data registered in the reception update list 242 for a corresponding table. In the switchover time, of update counts in the reception update table list 244, a count which has been received from the replication processing unit 130 at the start of the switchover is incremented by the DB manager 210 each time an update request relating to an unsynchronized table is received from the client 300 and is decremented by the replication processing unit 130 each time corresponding data is stored in the DB 220.

[Content of Processing in Normal Time]

The content of processing in the database system 1 will now be described in more detail. First, processing in the normal time as described above will be described. FIGS. 2 to 6 are diagrams for explaining the operation of the database system 1 in a normal time.

Figure 2:
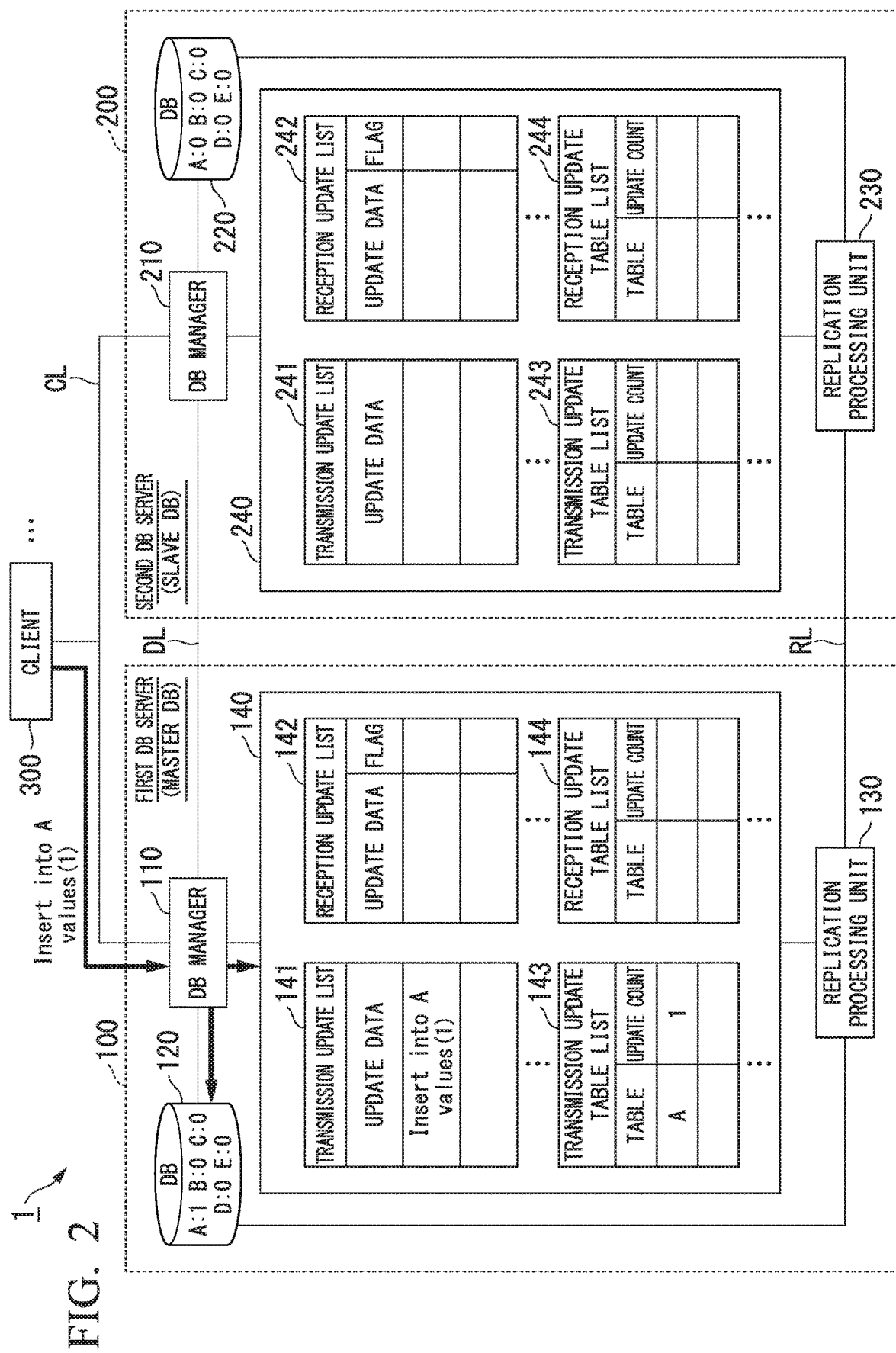
FIG. 2 is a diagram for explaining the operation of the database system 1 in normal time.

Situations will be illustrated and described below in time series. FIG. 2 shows a situation where the client 300 has issued an update request to store "1" in the table A. The DB manager 110 stores "1" in the table A of the DB 120 and also registers data such as "Insert into A values (1)" indicating the content of the request from the client 300 (hereinafter referred to as update data) in the transmission update list 141 and further increments the update count of the table A in the transmission update table list 143 to 1.

Figure 3:
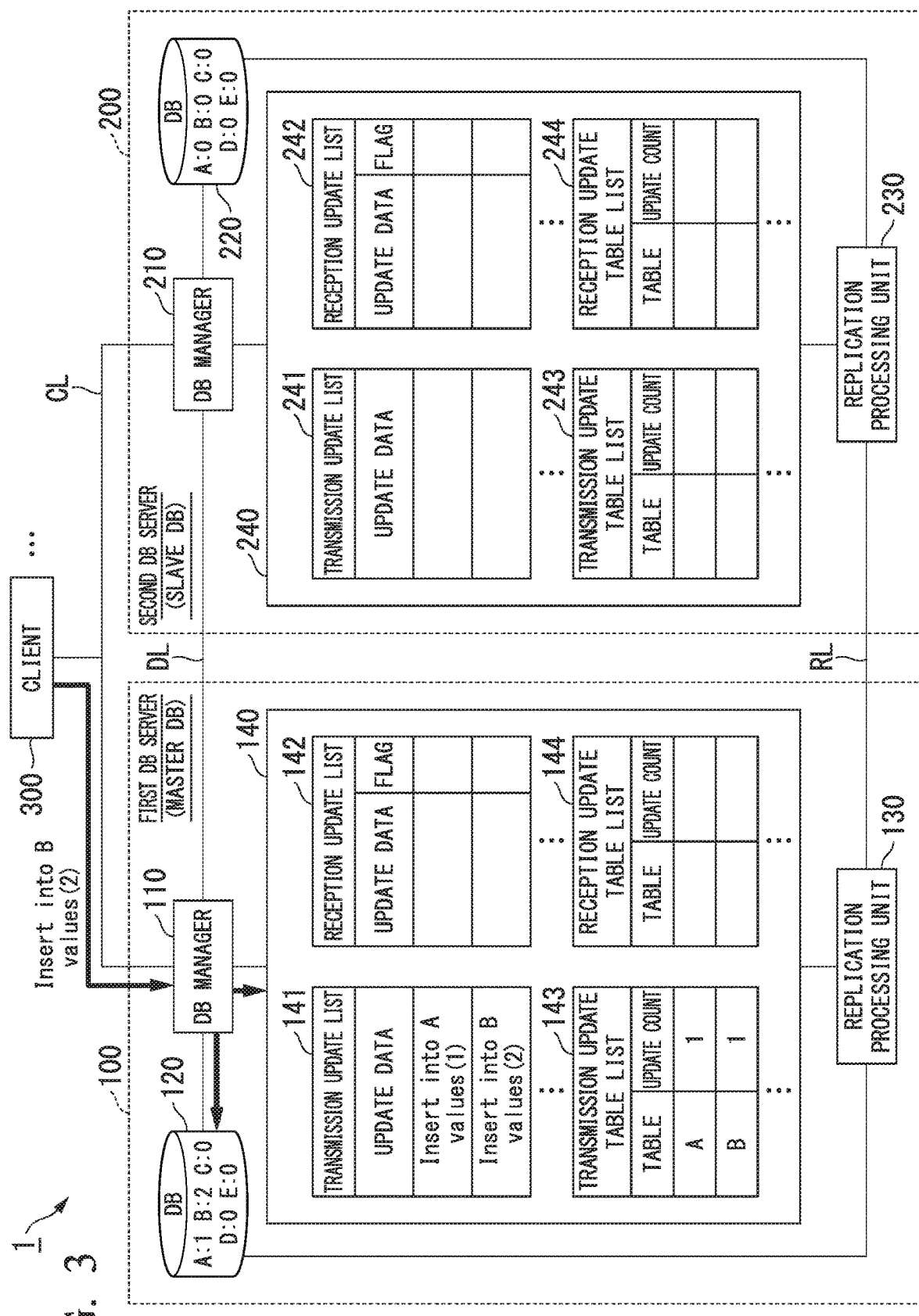
FIG. 3 is a diagram for explaining the operation of the database system 1 in normal time.

FIG. 3 is a diagram illustrating a situation where the client 300 has issued an update request to store "2" in the table B after the situation illustrated in FIG. 2. The DB manager 110 stores "2" in the table B of the DB 120 and also registers update data "Inset into B values (2)" in the transmission update list 141 and further increments the update count of the table B in the transmission update table list 143 to 1.

Figure 4:
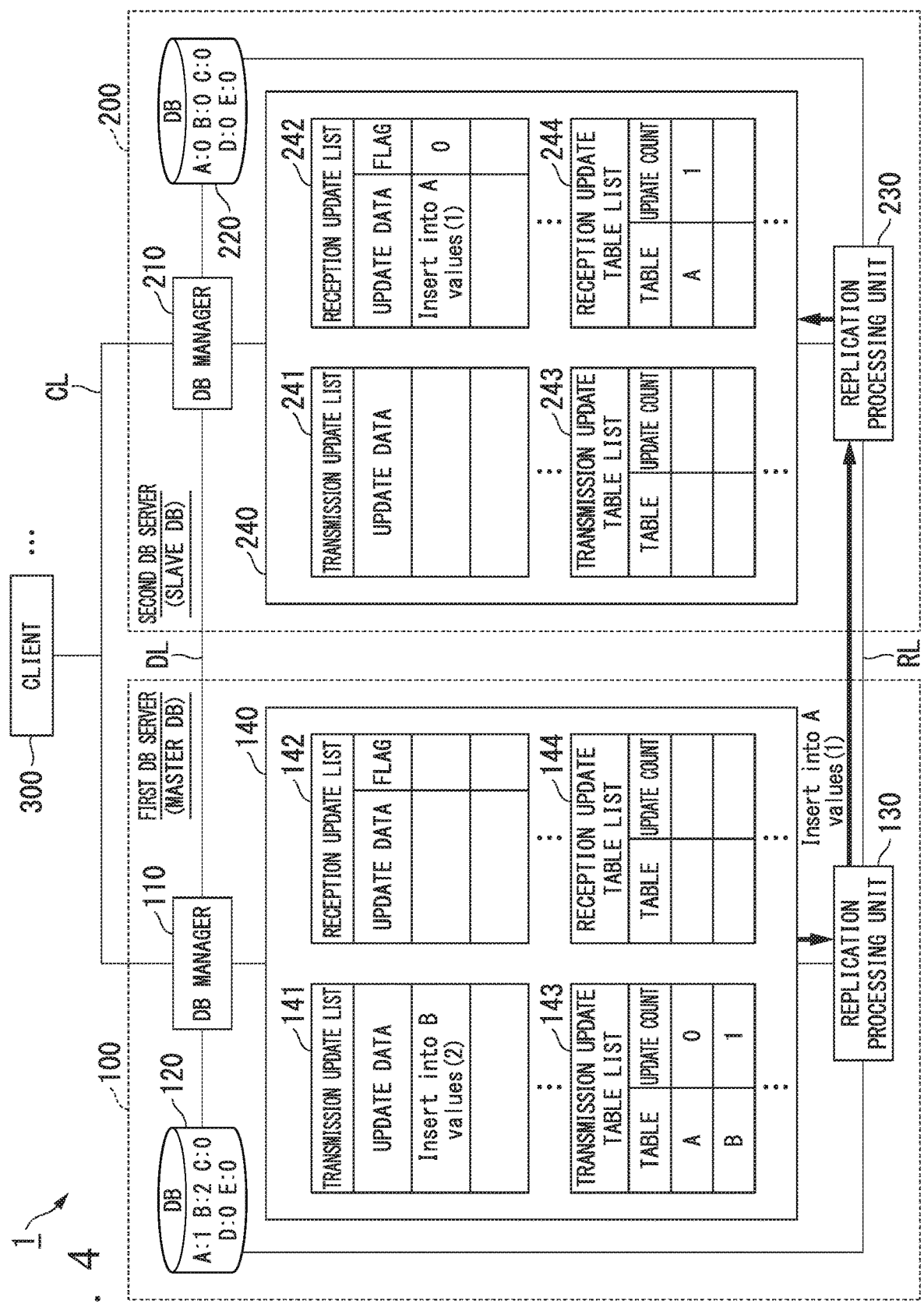
FIG. 4 is a diagram for explaining the operation of the database system 1 in normal time.

FIG. 4 is a diagram illustrating a situation where the replication processing unit 130 has transmitted both the update data relating to the table A "Inset into A values (1)" in the transmission update list 141 and information relating to the table A in the transmission update table list 143 to the replication processing unit 230 and the replication processing unit 230 has updated both the reception update list 242 and the reception update table list 244 after the situation illustrated in FIG. 3. The replication processing unit 230 registers the update data relating to the table A "Inset into A values (1)" as the update data of the reception update list 242 and also increments the update count relating to the table A in the reception update table list 244 to 1. Here, the flag of the reception update list 242 remains zero, that is, remains unset. The flags of the reception update list 142 and the reception update list 242 are used exclusively in the switchover time. Here, it is to be noted that, in the normal time, the transmission of the information of the transmission update table list 143 may be omitted when the information of the transmission update list 141 is transmitted. Further, in the normal time, all the information of the transmission update table list 143 may be collectively transmitted, instead of only a part thereof corresponding to the information of the transmission update list 141 to be transmitted.

Figure 5:
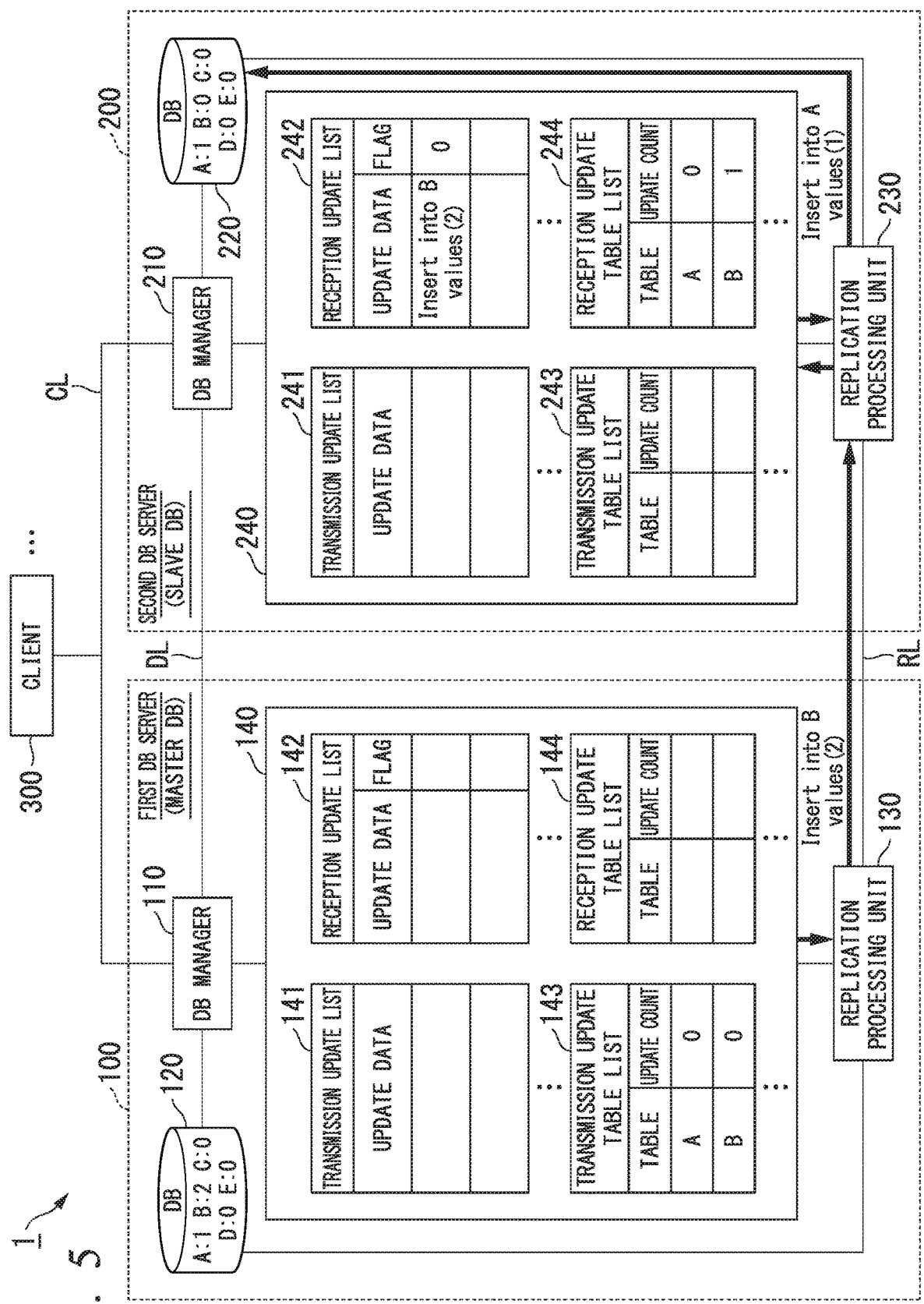
FIG. 5 is a diagram for explaining the operation of the database system 1 in normal time.

FIG. 5 is a diagram illustrating a situation where the replication processing unit 230 has updated the DB 220 and the replication processing unit 130 has transmitted both the update data relating to the table B "Inset into B values (2)" in the transmission update list 141 and information relating to the table B in the transmission update table list 143 to the replication processing unit 230 after the situation illustrated in FIG. 4. The replication processing unit 230 updates the DB 220 on the basis of the update data relating to the table A "Inset into A values (1)," which is registered in the reception update list 242, and decrements the update count of the table A in the reception update table list 244 to 0. The replication processing unit 230 registers the update data relating to the table B "Inset into B values (2)" as the update data of the reception update list 242 and also increments the update count of the table B in the reception update table list 244 to 1. In this manner, data transmission is performed between the replication processing unit 130 and the replication processing unit 230, for example, in accordance with a rule that one transmit the next update data after being notified of completion of storage in the DB of the other.

Figure 6:
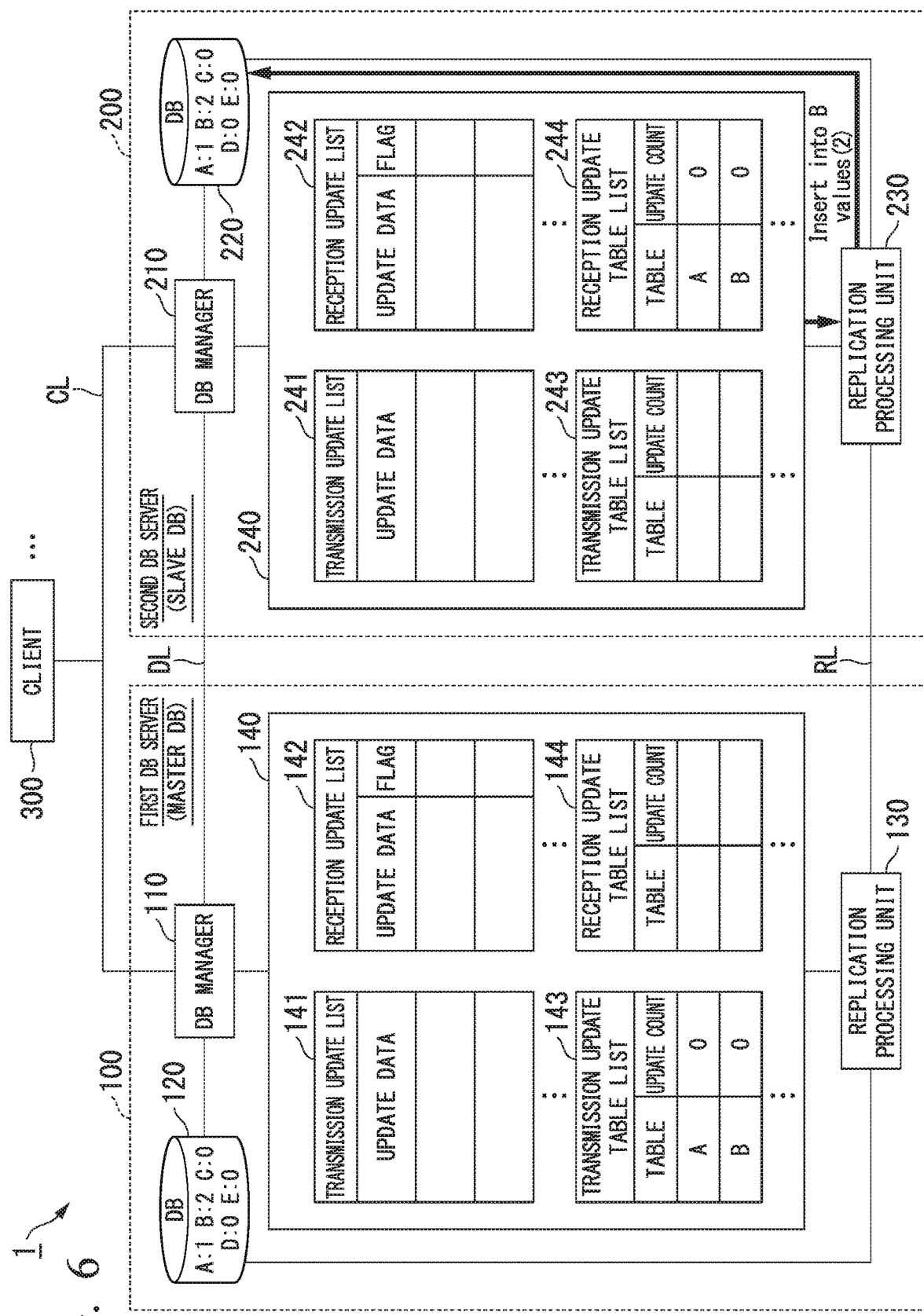
FIG. 6 is a diagram for explaining the operation of the database system 1 in normal time.

FIG. 6 is a diagram illustrating a situation where the replication processing unit 230 has updated the DB 220 after the situation illustrated in FIG. 5. The replication processing unit 230 updates the DB 220 on the basis of the update data relating to the table B "Inset into B values (2)," which is registered in the reception update list 242, and decrements the update count of the table B in the reception update table list 244 to 0. As a result, synchronization is completed between the DBs 120 and 220 for all tables. The database system 1 repeats such a series of operations and continues asynchronous replication.

[Content of Processing in Switchover Time]

Processing in a switchover time will now be described. FIGS. 7 to 14 are diagrams for explaining the operation of the database system 1 in a switchover time.

Figure 7:
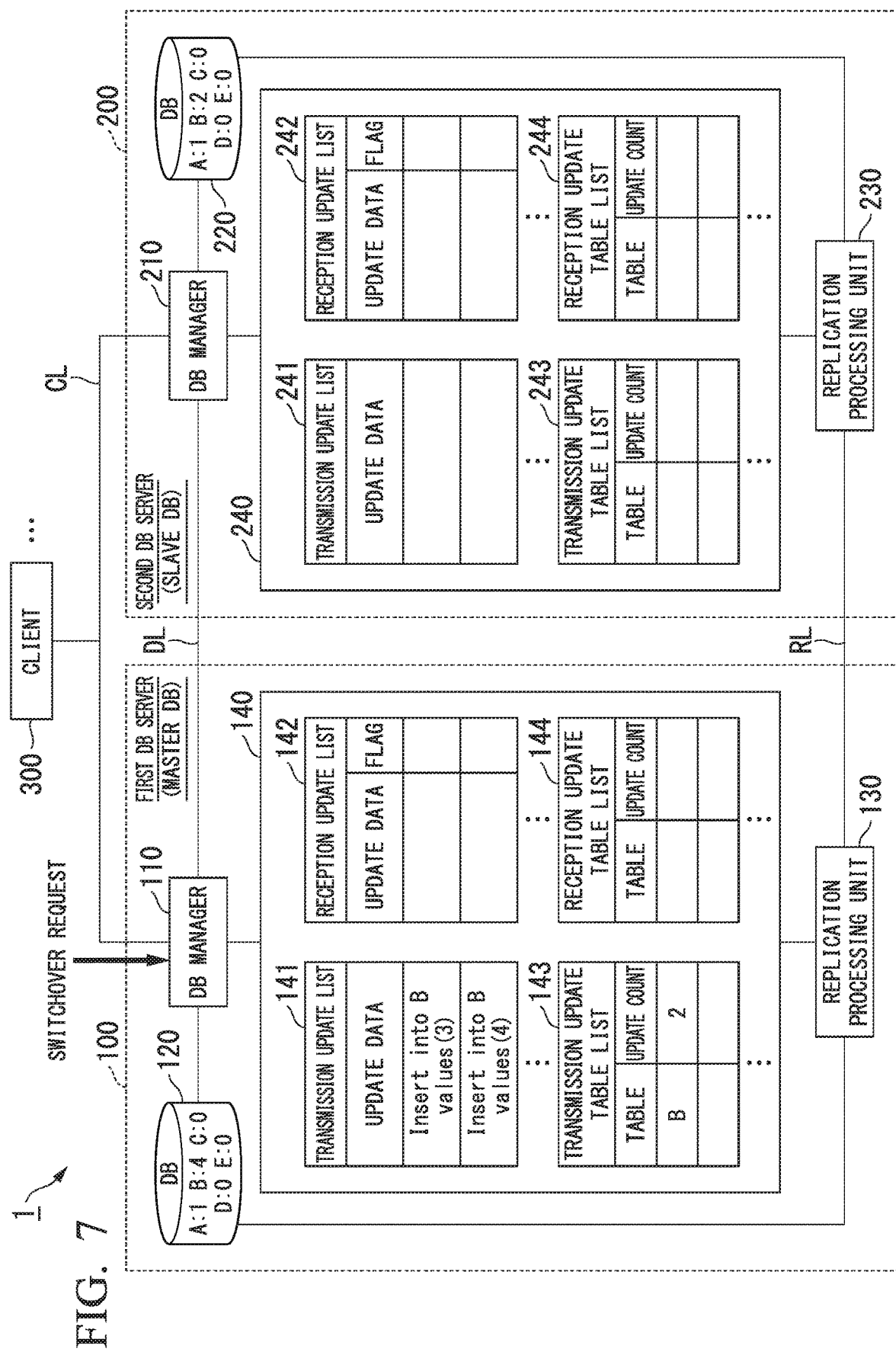
FIG. 7 is a diagram for explaining the operation of the database system 1 in switchover time.

Situations will be illustrated and described below in time series. FIG. 7 is a diagram illustrating a situation where a switchover request has been received. A switchover request (an example of a role change request) may be received from a device other than the client 300 (including an input device such as a keyboard and a mouse) or may be received from the client 300. A switchover request may also be received from a higher-level database system. In this situation, update data relating to the table B "Inset into B values (3)" and "Inset into B values (4)" have been registered in the transmission update list 141. Both are reflected in the DB 120 such that "4" is stored in the table B on the basis of "Inset into B values (4)" which was received later. Also, 2 has been registered in the transmission update table list 143 as the update count of the table B.

Figure 8:
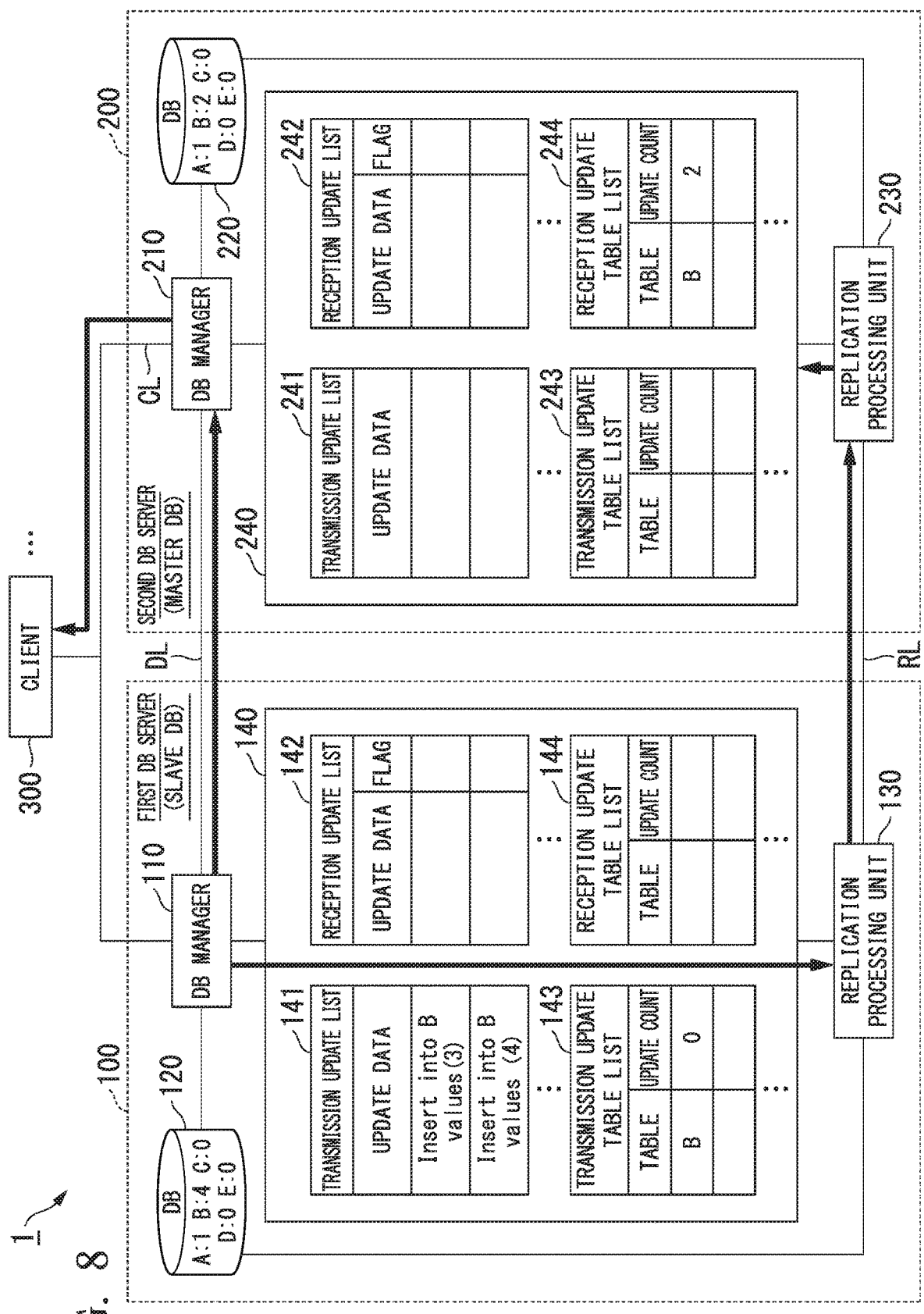
FIG. 8 is a diagram for explaining the operation of the database system 1 in switchover time.

FIG. 8 is a diagram illustrating a situation after the situation illustrated in FIG. 7. The DB manager 110 provides a switchover notification to the DB manager 210 via the DB link DL. Thereafter, the DB manager 210 notifies the client 300 that it will receive requests from the client 300.

The DB manager 110 also instructs the replication processing unit 130 to transmit all information registered in the transmission update table list 143 to the replication processing unit 230 in accordance with the switchover. The replication processing unit 130 transmits all information registered in the transmission update table list 143 to the replication processing unit 230 and also resets (deletes, eliminates, or disables) the information registered in the transmission update table list 143. The replication processing unit 230 registers the information received from the replication processing unit 130 in the reception update table list 244.

Figure 9:
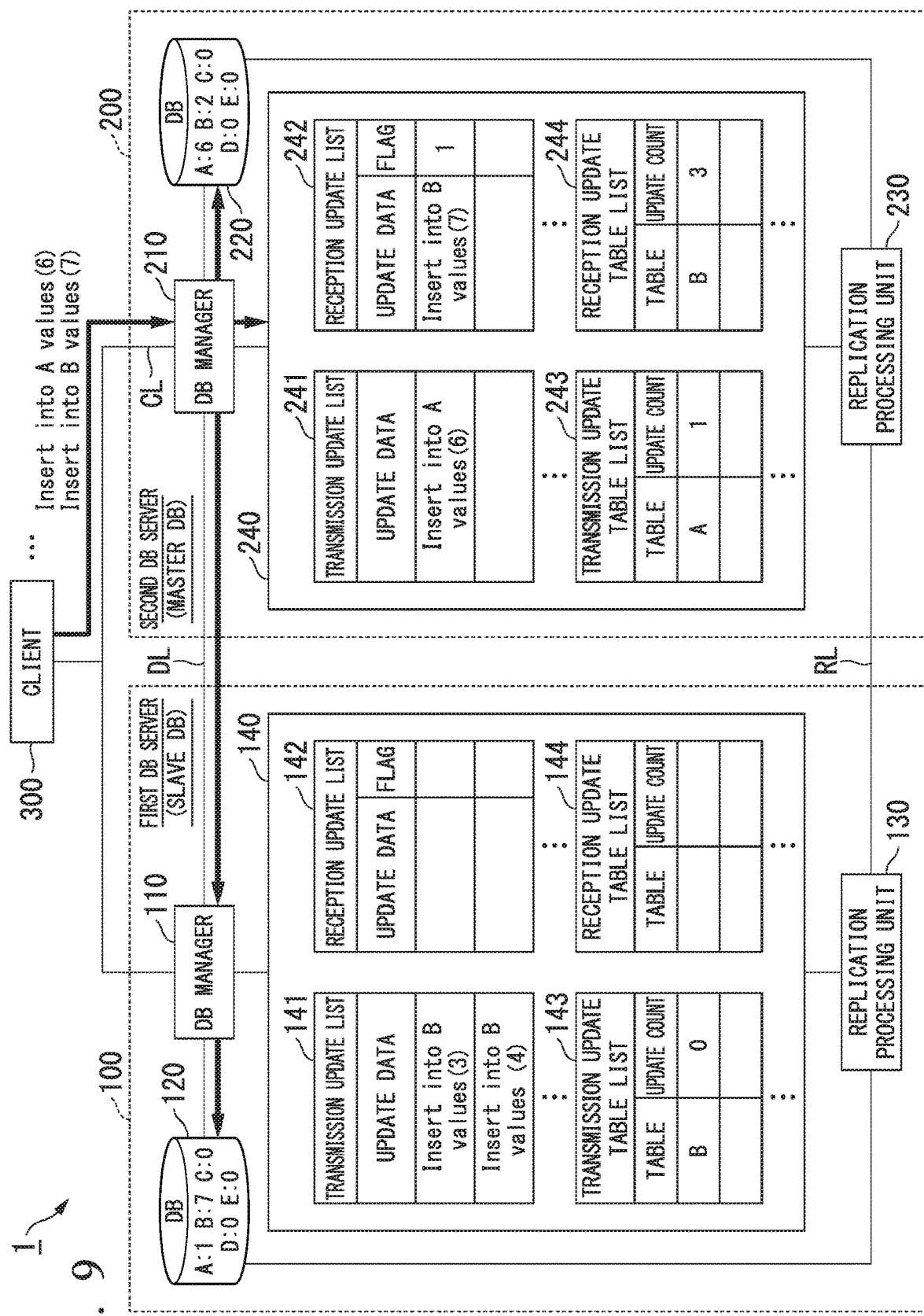
FIG. 9 is a diagram for explaining the operation of the database system 1 in switchover time.

FIG. 9 is a diagram illustrating a situation where the DB manager 210 has received an update request to store "6" in the table A and an update request to store "7" in the table B from the client 300 after the situation illustrated in FIG. 8. In this case, the DB manager 210 determines whether or not the table relating to each request is unsynchronized. For example, the DB manager 210 determines that the table relating to each request is unsynchronized if the update count of the table in the reception update table list 244 is not zero and determines that it is synchronized if the update count is zero.

If the request relates to a synchronized table, the DB manager 210 stores corresponding data in its own DB 220 and registers information of the table in the transmission update list 241 and the transmission update table list 243. In the example of FIG. 9, for the synchronized table A, the DB manager 210 stores "6" in its own DB 220 and also registers update data "Insert into A values (6)" in the transmission update list 241 and increments the update count of the table A in the transmission update table list 243 to 1.

On the other hand, if the request relates to an unsynchronized table, the DB manager 210 transfers the request (or a result of interpreting the request) to the DB manager 110 via the DB link DL and registers the result of interpreting the request in the reception update list 242. At this time, the DB manager 210 sets the flag to 1 for the registered result and does not update the DB 220 in order to maintain the order of updating. Thus, each of the flags in the reception update list 142 and the reception update list 242 indicates that it is based on a request received for an unsynchronized table during the period from the start to completion of switchover. In the example of FIG. 9, for the unsynchronized table B, the DB manager 210 registers update data "Insert into B values (7)" in the reception update list 242, sets the flag to 1, and increments the update count of the table B in the reception update table list 244 to 3.

Upon receiving the request relating to the unsynchronized table, the DB manager 110 stores "7" in the table B of the DB 120. In this case, since the DB manager 110 is aware that the request has been transferred during switchover, the DB manager 110 updates the DB 120 but does not update the transmission update list 141 and the transmission update table list 143.

It is to be noted that, even when a request other than the update request, for example, a read request, has been received, the same allocation thereof is performed. That is, if the read request relates to an unsynchronized table, the DB manager 210 transfers the request (or a result of interpreting the request) to the DB manager 110 via the DB link DL and also returns the result returned from the DB manager 110 to the client 300, and if the read request relates to a synchronized table, the DB manager 210 performs reading from the DB 220 and returns the result to the client 300.

Figure 10:
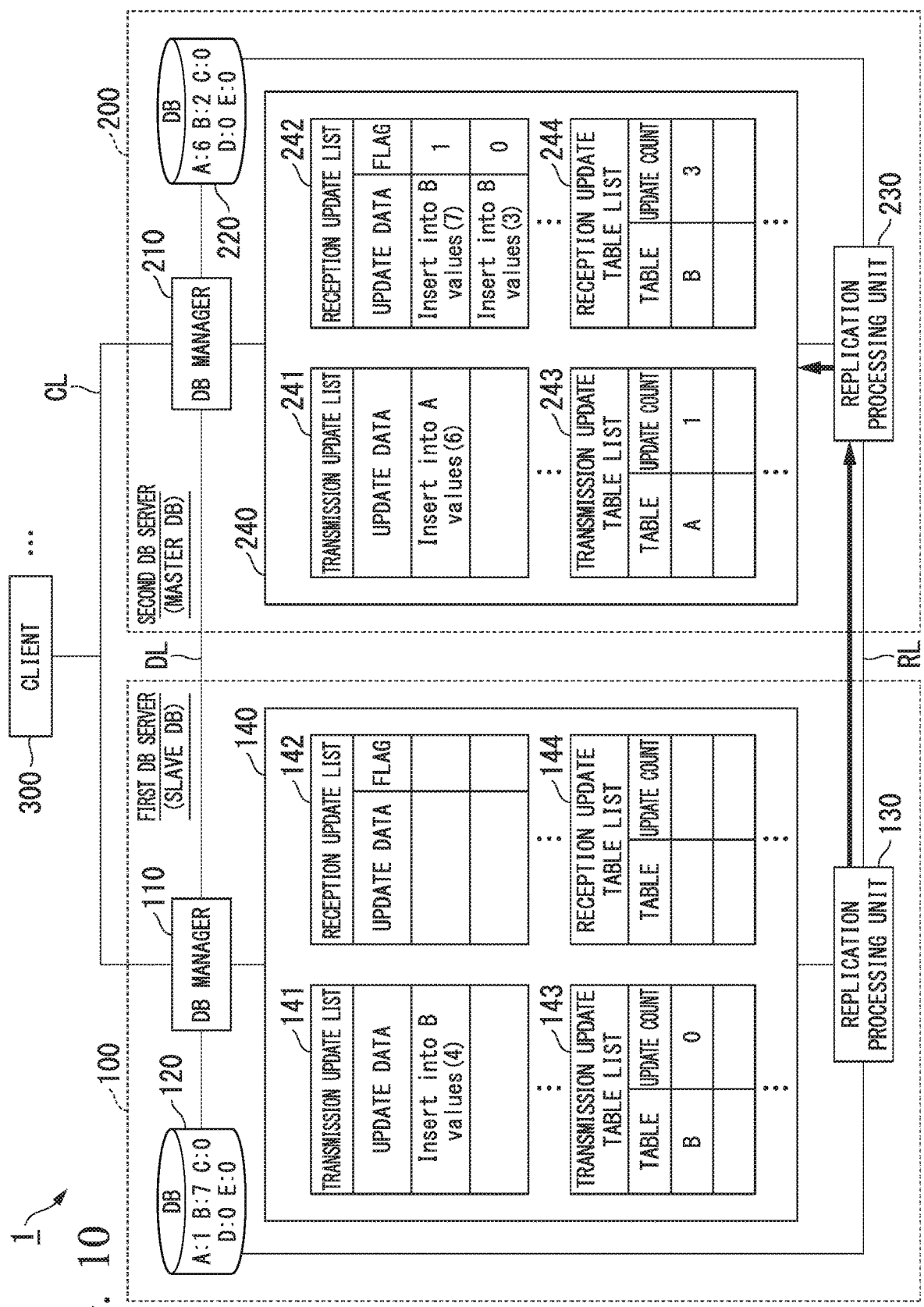
FIG. 10 is a diagram for explaining the operation of the database system 1 in switchover time.

FIG. 10 is a diagram illustrating a situation where the replication processing unit 130 has transmitted update data relating to the table B "Inset into B values (3)" in the transmission update list 141 to the replication processing unit 230 and the replication processing unit 230 has updated the reception update list 242 after the situation illustrated in FIG. 9. As shown, the replication processing unit 230 registers "Insert into B values (3)" in the reception update list 242 and sets the flag to 0.

Figure 11:
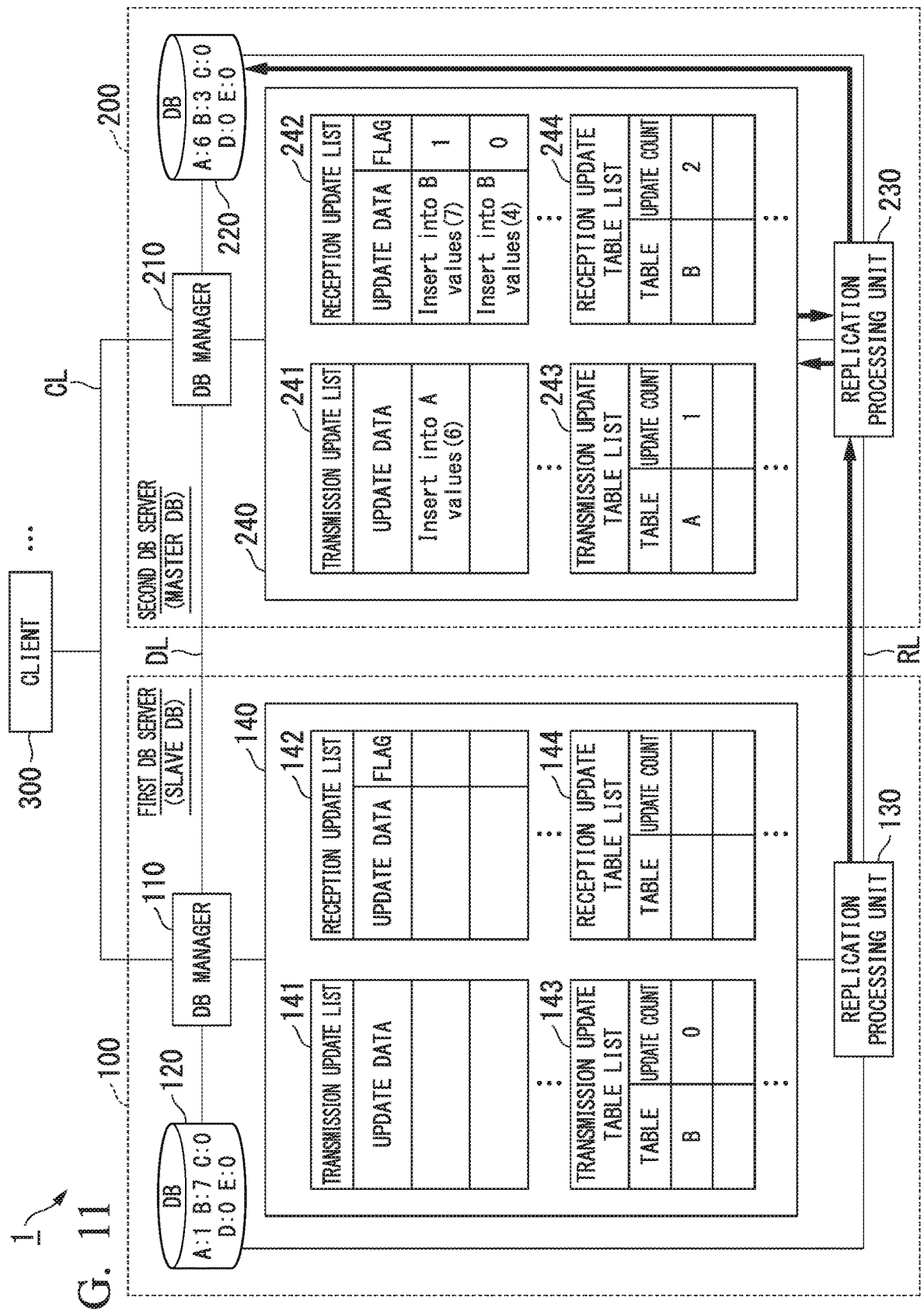
FIG. 11 is a diagram for explaining the operation of the database system 1 in switchover time.

FIG. 11 illustrates a situation where the replication processing unit 230 has updated the DB 220, the replication processing unit 130 has transmitted both update data relating to the table B "Inset into B values (4)" in the transmission update list 141 and information regarding the table B in the transmission update table list 143 to the replication processing unit 230, and the replication processing unit 230 has updated the reception update list 242 and the reception update table list 244 after the situation illustrated in FIG. 10. As shown, the replication processing unit 230 stores "3" in the table B of the DB 220 and decrements the update count of the table B in the reception update table list 244 to 2. Here, the replication processing unit 230 first stores the update data whose flag is zero in the DB 220. Thus, the order of update processing is maintained. Subsequently, the replication processing unit 230 registers "Inset into B values (4)" in the reception update list 242.

It is to be noted that the process of transmitting information of the transmission update list from the old master side to the new master side, which is shown in FIG. 11, may be performed in order from the table for which a read request or an update request has been issued to the new master side. The process of updating the DB at the new master side on the basis of the transmission update list from the old master side, which is shown in FIG. 12, may also be performed in order from the table for which a read request or an update request has been issued to the new master side.

Figure 12:
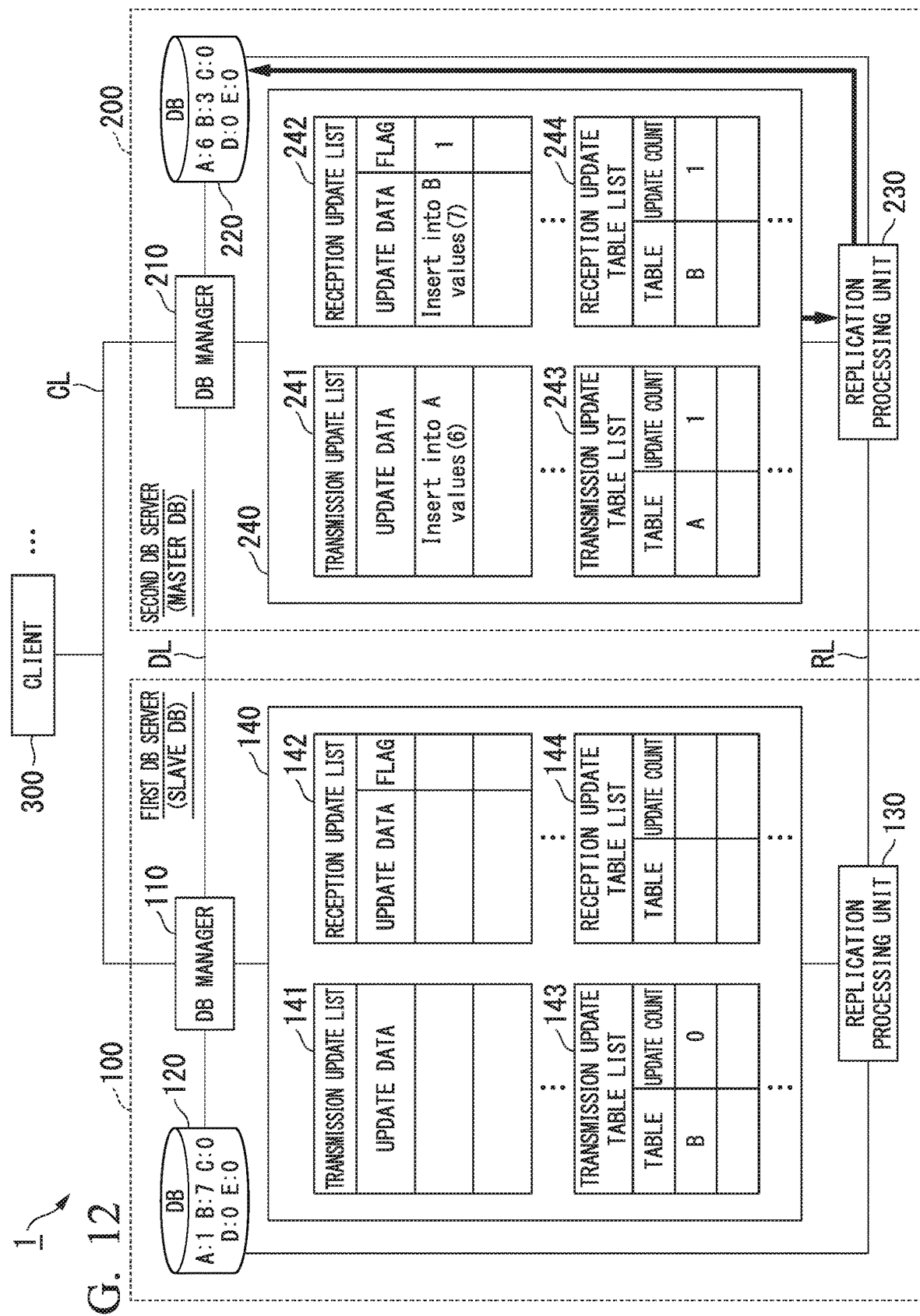
FIG. 12 is a diagram for explaining the operation of the database system 1 in switchover time.

FIG. 12 is a diagram illustrating a situation where the replication processing unit 230 has updated the DB 220 and updated the reception update list 242 and the reception update table list 244 after the situation illustrated in FIG. 11. As shown, the replication processing unit 230 stores "4" in the table B of the DB 220 and decrements the update count of the table B in the reception update table list 244 to 1. Here, the replication processing unit 230 also first stores the update data whose flag is zero in the DB 220.

Figure 13:
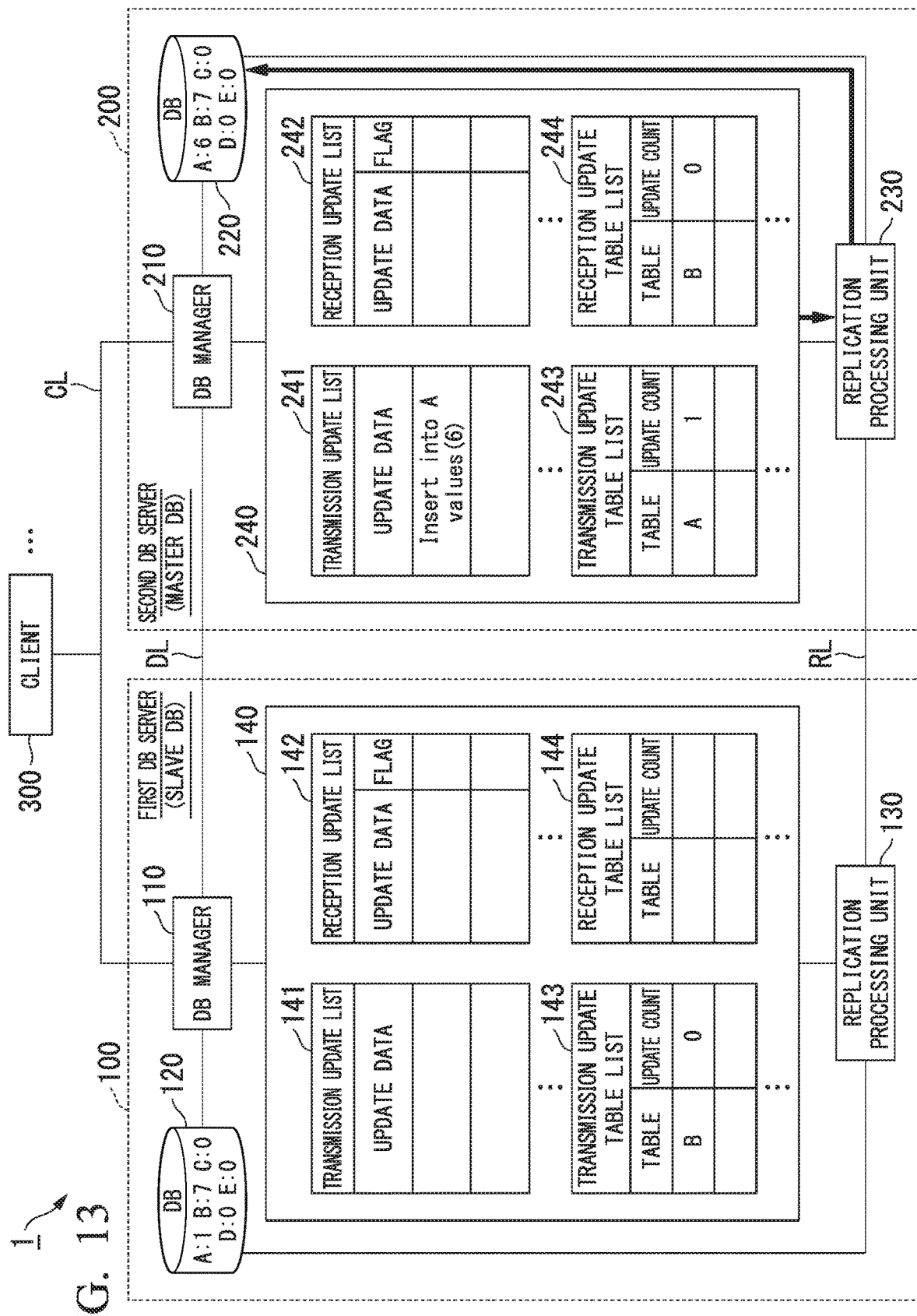
FIG. 13 is a diagram for explaining the operation of the database system 1 in switchover time.

FIG. 13 is a diagram illustrating a situation where the replication processing unit 230 has updated the DB 220 and updated the reception update list 242 and the reception update table list 244 after the situation illustrated in FIG. 12. As shown, the replication processing unit 230 updates the DB 220 on the basis of the update data whose flag is 1 because there is no update data whose flag is zero for the table B. The replication processing unit 230 stores "7" in the table B of the DB 220 and decrements the update count of the table B in the reception update table list 244 to 0. It is to be noted that the processing of this situation may also be performed by the DB manager 210.

Figure 14:
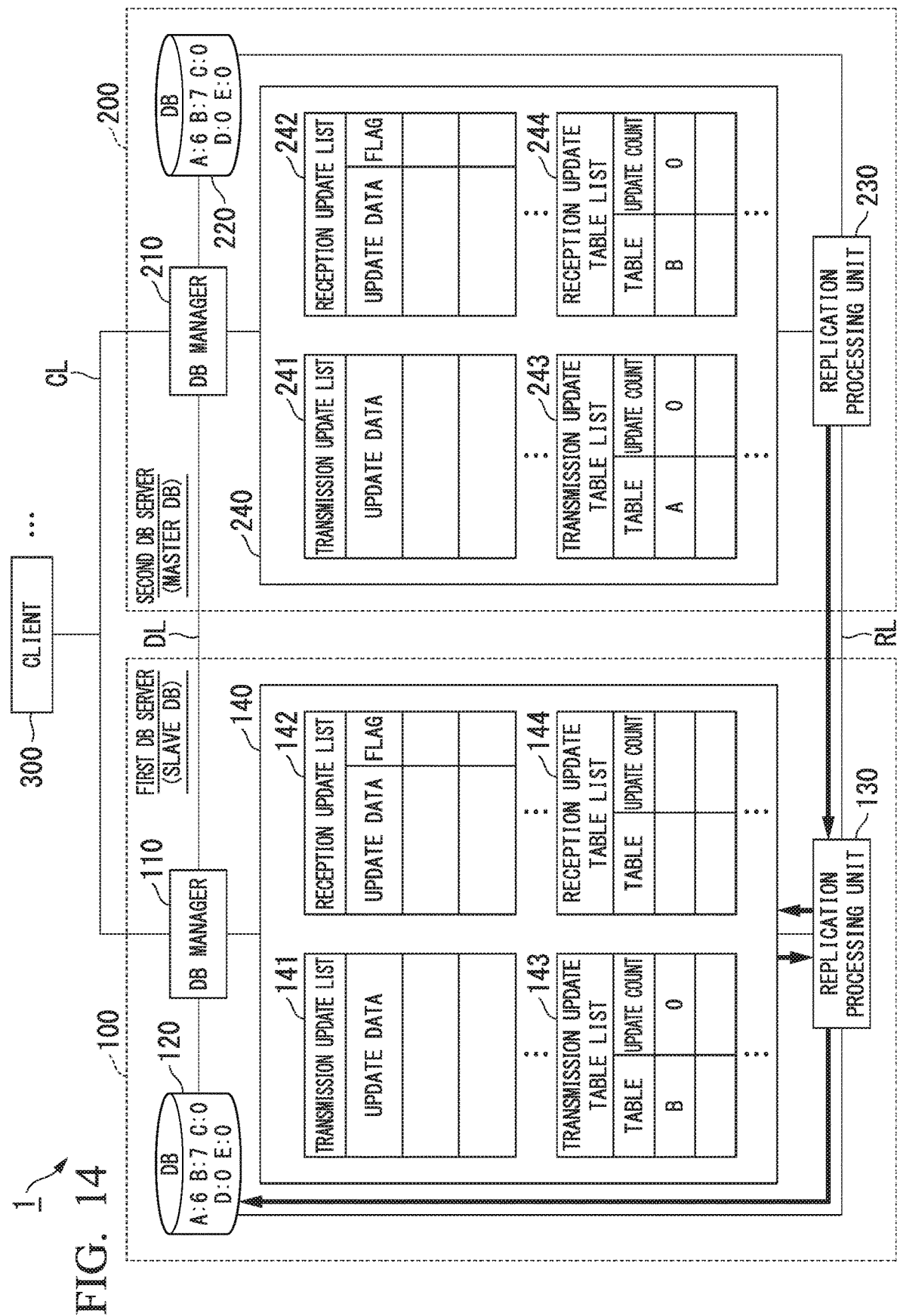
FIG. 14 is a diagram for explaining the operation of the database system 1 in switchover time.

The update data "Insert into A values (6)" for the table A which has already been synchronized at the time of starting switchover, which is registered in the transmission update list 241 after switchover starts, is transmitted to the first DB server 100 and reflected in the DB 120 at an arbitrary timing after or during the situations shown in FIGS. 11 to 13 in the same manner as in the normal time. FIG. 14 is a diagram illustrating a situation where synchronization of the table A has been completed. Thus, the synchronization of unsynchronized data is completed. For example, the DB manager 210 of the new master DB determines that the synchronization of the unsynchronized data has been completed and notifies the DB manager 110 of the old master DB of the completion. Upon completion of the synchronization of the unsynchronized data, the process returns to the processing in the normal time. It may also be determined that the synchronization of the unsynchronized data has been completed from the fact that the synchronization of unsynchronized data which was present at the time of starting switchover has been completed as shown in FIG. 13.

[Process Flow]

A process flow of the database system 1 in a switchover time will be described below. Here, it is assumed that the first DB server 100 is an old master DB and the second DB server 200 is a new master DB, but there may also be the reverse case.

Figure 15:
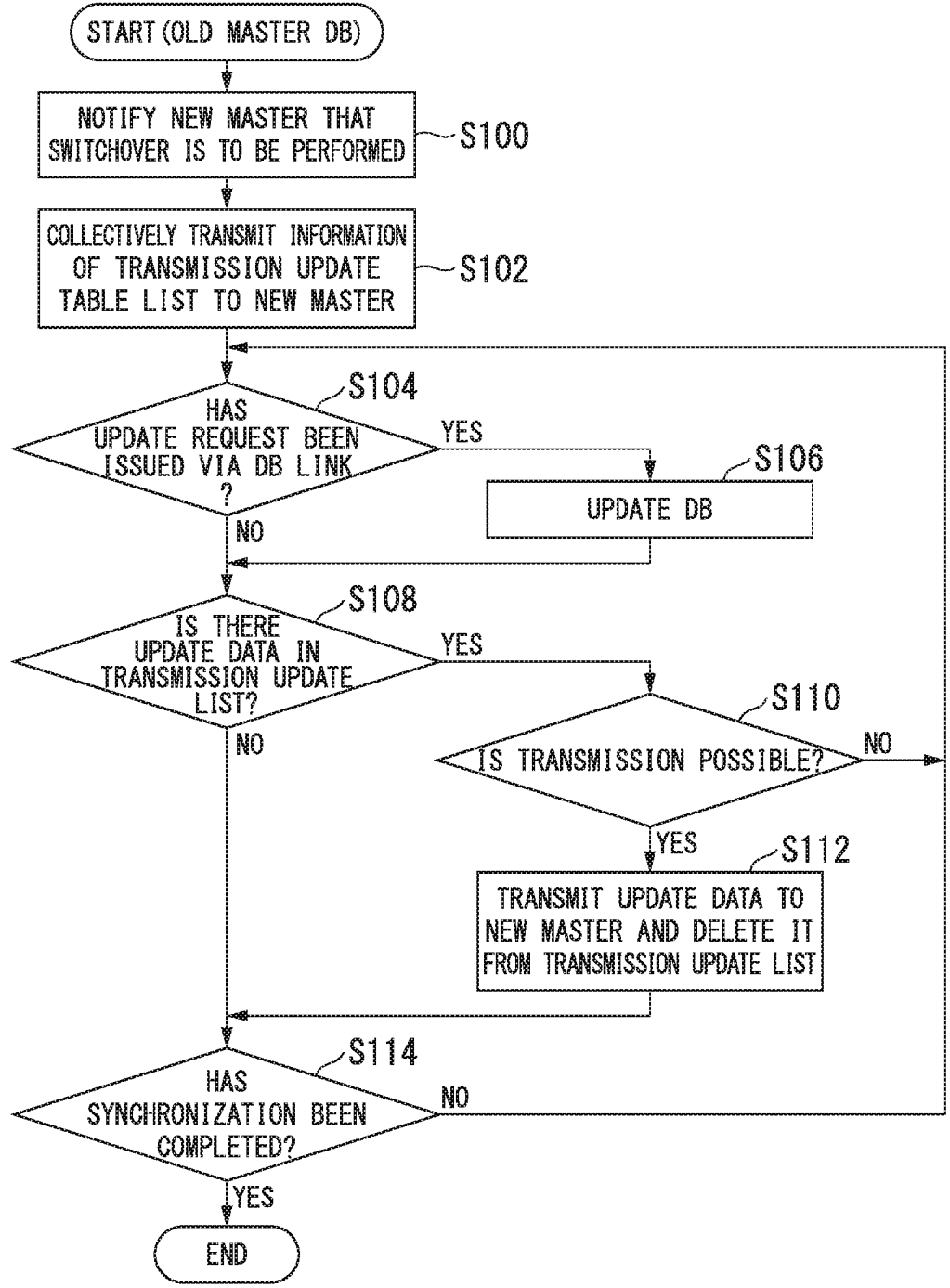
FIG. 15 is a flowchart showing an example of a flow of processing performed by a DB manager 110 and a replication processing unit 130 of a first DB server 100.

FIG. 15 is a flowchart showing an example of a flow of processing performed by the DB manager 110 and the replication processing unit 130 of the first DB server 100. The process of this flowchart starts when the DB manager 110 receives a switchover request.

First, the DB manager 110 notifies the DB manager 210 of the second DB server 200 which has become a new master DB of information indicating that switchover is to be performed (step S100). Next, the replication processing unit 130 collectively transmits information registered in the transmission update table list 143 to the replication processing unit 230 (step S102).

Next, the DB manager 110 determines whether or not an update request has been issued via the DB link DL (step S104). When an update request has been issued via the DB link DL, the DB manager 110 updates the DB 120 (step S106). Here, it to be noted that the update list module 140 is not updated in step S106.

Next, the replication processing unit 130 determines whether or not there is update data in the transmission update list 141 (step S108). When there is update data in the transmission update list 141, the replication processing unit 130 determines whether or not transmission of the update data via the replication link RL is possible (step S110). When the transmission is not possible, the process returns to step S104. Here, the transmission is possible, for example, when a notification of the completion of reflection of previously transmitted update data in the DB 220 has not been received from the replication processing unit 230 or when the replication link RL is being used for communication. On the other hand, when the transmission is possible, the replication processing unit 130 transmits the earliest registered update data among the update data to the replication processing unit 230 via the replication link RL and deletes the transmitted updated data from the transmission update list 141 (step S112).

Then, the DB manager 110 determines whether or not synchronization of unsynchronized data has been completed (step S114). Upon determining that synchronization of the unsynchronized data has not been completed, the process returns to step S104, and upon determining that synchronization of the unsynchronized data has been completed, the process of this flowchart ends. Here, the DB manager 110 determines whether or not synchronization of the unsynchronized data has been completed, for example, on the basis of the notification information received from the DB manager 210 via the DB link DL.

Figure 16:
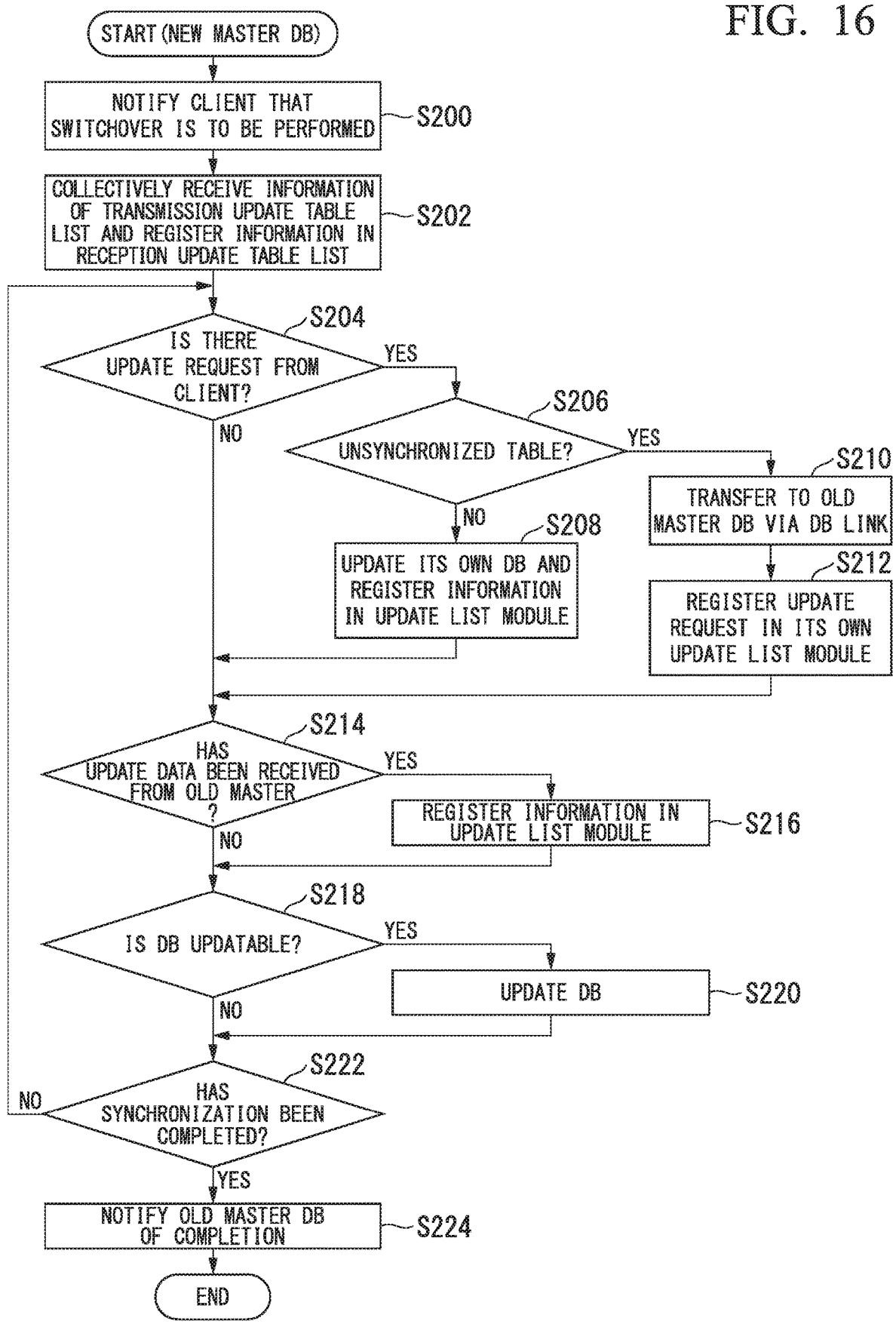
FIG. 16 is a flowchart showing an example of a flow of processing performed by a DB manager 210 and a replication processing unit 230 of a second DB server 200.

FIG. 16 is a flowchart showing an example of a flow of processing performed by the DB manager 210 and the replication processing unit 230 of the second DB server 200. The process of this flowchart starts when the DB manager 210 has received a switchover notification (the notification of step S100 in FIG. 15).

First, the DB manager 210 notifies the client 300 that switchover is to be performed (step S200). Next, the replication processing unit 230 collectively receives the information of the transmission update table list 143 of the first DB server 100 from the replication processing unit 130 and registers the same in the reception update table list 244 (step S202).

Next, the DB manager 210 determines whether or not an update request has been received from the client 300 (step S204). Upon determining that an update request has been received from the client 300, the DB manager 210 determines whether or not the target of the update request is an unsynchronized table (step S206). Upon determining that the target of the update request is not an unsynchronized table, the DB manager 210 updates its own DB 220 (of the second DB server 200) and registers the update content in the update list module 240 (step S208).

On the other hand, upon determining that the target of the update request is an unsynchronized table, the DB manager 210 transfers the update request to the DB manager 110 of the first DB server 100, which is the old master DB, via the DB link DL (step S210). Then, the DB manager 210 registers the update request in its own update list module 240 (step S212).

Next, the replication processing unit 230 determines whether or not update data has been received from the replication processing unit 130 of the first DB server 100 which is the old master DB (step S214). When update data has been received from the replication processing unit 130, the replication processing unit 230 registers information such as the update data in the update list module 140 (step S216). Next, the replication processing unit 230 determines whether or not the DB 220 is updatable (step S218). Upon determining that the DB 220 is updatable, the replication processing unit 230 updates the DB 220 on the basis of the content of the update list module 240 (step S220). The DB is not updatable, for example, when the DB 220 is being updated by the DB manager 210.

Next, the DB manager 210 determines whether or not synchronization of unsynchronized data has been completed (step S222). Upon determining that synchronization of the unsynchronized data has not been completed, the process returns to step S204. On the other hand, upon determining that synchronization of the unsynchronized data has been completed, the DB manager 210 notifies the DB manager 110 of the first DB server 100, which is the old master DB, of the completion (step S224). For example, the DB manager 210 determines whether or not all information of the update list modules 140 and 240 has been reset through communication with the first DB server 100 and determines that synchronization of the unsynchronized data has been completed upon confirming that all the information has been reset.

According to the process described above, it is possible to respond to the client more quickly when switchover is performed.

FIG. 17 is a diagram schematically showing a flow of processing performed in a database system of a comparative example when switchover is performed. In the database system of the comparative example, if there is unsynchronized data in an old master upon the occurrence of switchover (S0 in the figure), the unsynchronized data is transferred and stored in a memory of a new master, and the switchover is completed after the unsynchronized data is stored in a DB of the new master. In this process, a period of time for the processing for storing unsynchronized data in the DB is dominant and completion of the switchover takes time, for example, on the order of several to several tens of seconds.

Figure 18:
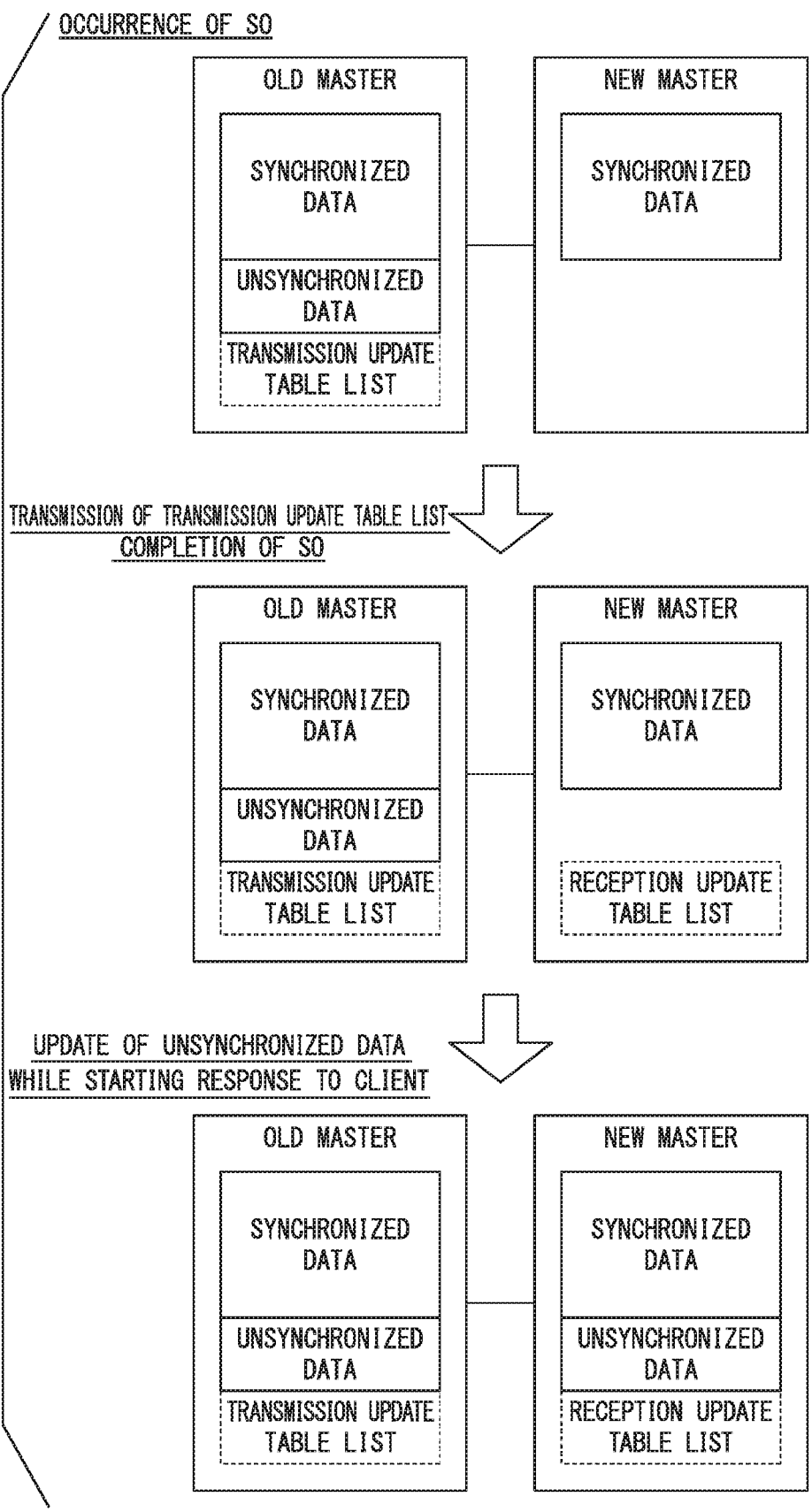
FIG. 18 is a diagram schematically showing a flow of processing performed in the database system 1 of the embodiment when switchover is performed.

FIG. 18 is a diagram schematically showing a flow of processing performed in the database system 1 of the embodiment when switchover is performed. In the database system 1 of the embodiment, when switchover occurs, first, the transmission update table list is transmitted from the old master to the new master and the new master holds the received transmission update table list as a reception update table list. At this time, switchover is complete. In the embodiment, processing for DB update is not required until switchover is completed and it is expected that the process is completed, for example, within a time on the order of less than 1 second. The new master then allocates a request from the client to itself or to the old master while referring to the reception update table list and thus it is possible to quickly respond to requests from the client basically for all tables of the database system 1.

[When Three or More DB Servers are Provided]

Figure 19:
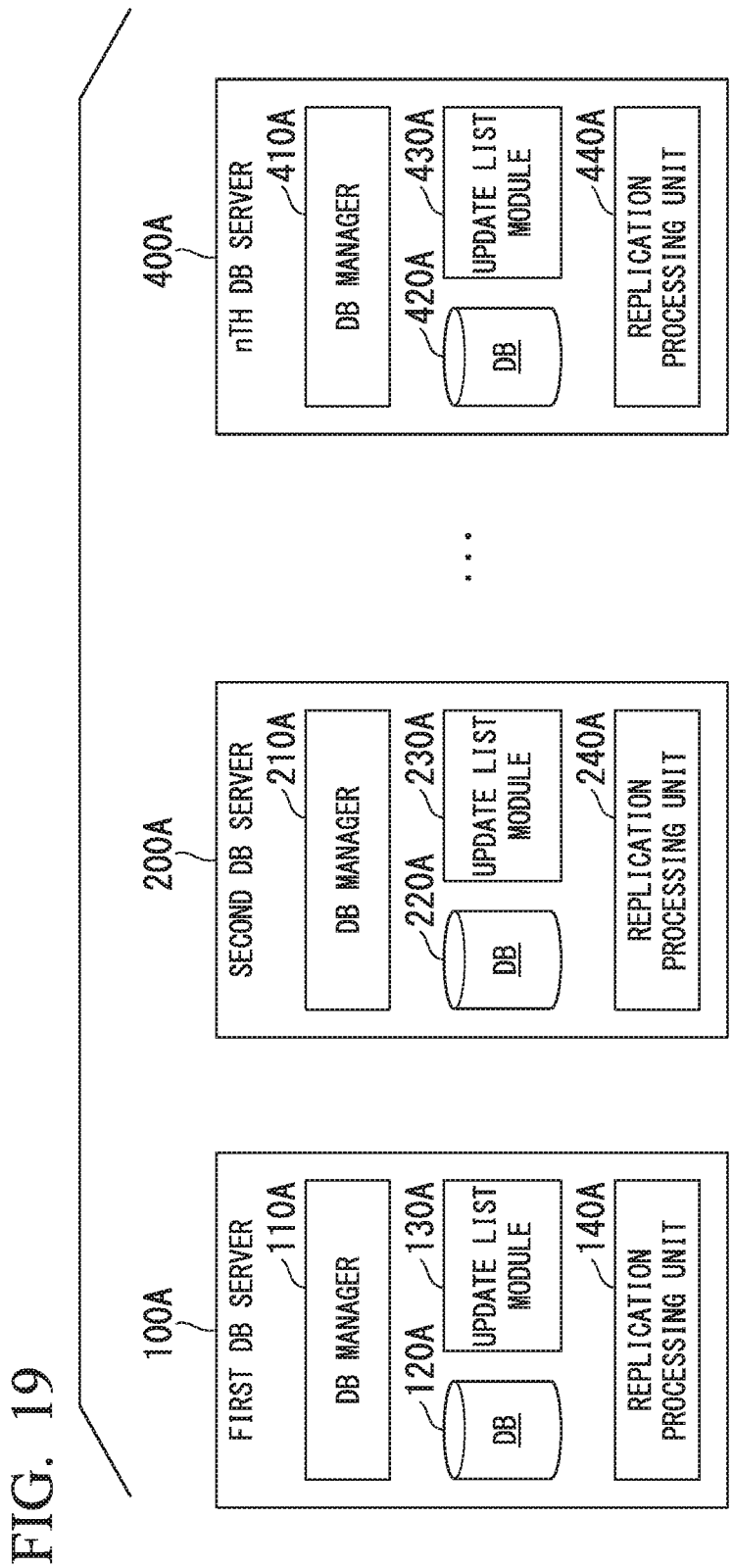
FIG. 19 is a schematic diagram of a database system 2 including three or more DB servers.

Although the database system has been described above as having two DB servers, the database system may include three or more DB servers. FIG. 19 is a schematic diagram of a database system 2 including three or more DB servers. In FIG. 19, the database system 2 includes a first DB server 100A, a second DB server 200A, and at least one nth DB server 400A (where n is a natural number of 3 or more). Each of the DB servers includes a DB manager, a DB, an update list module, and a replication processing unit.

Figure 20:
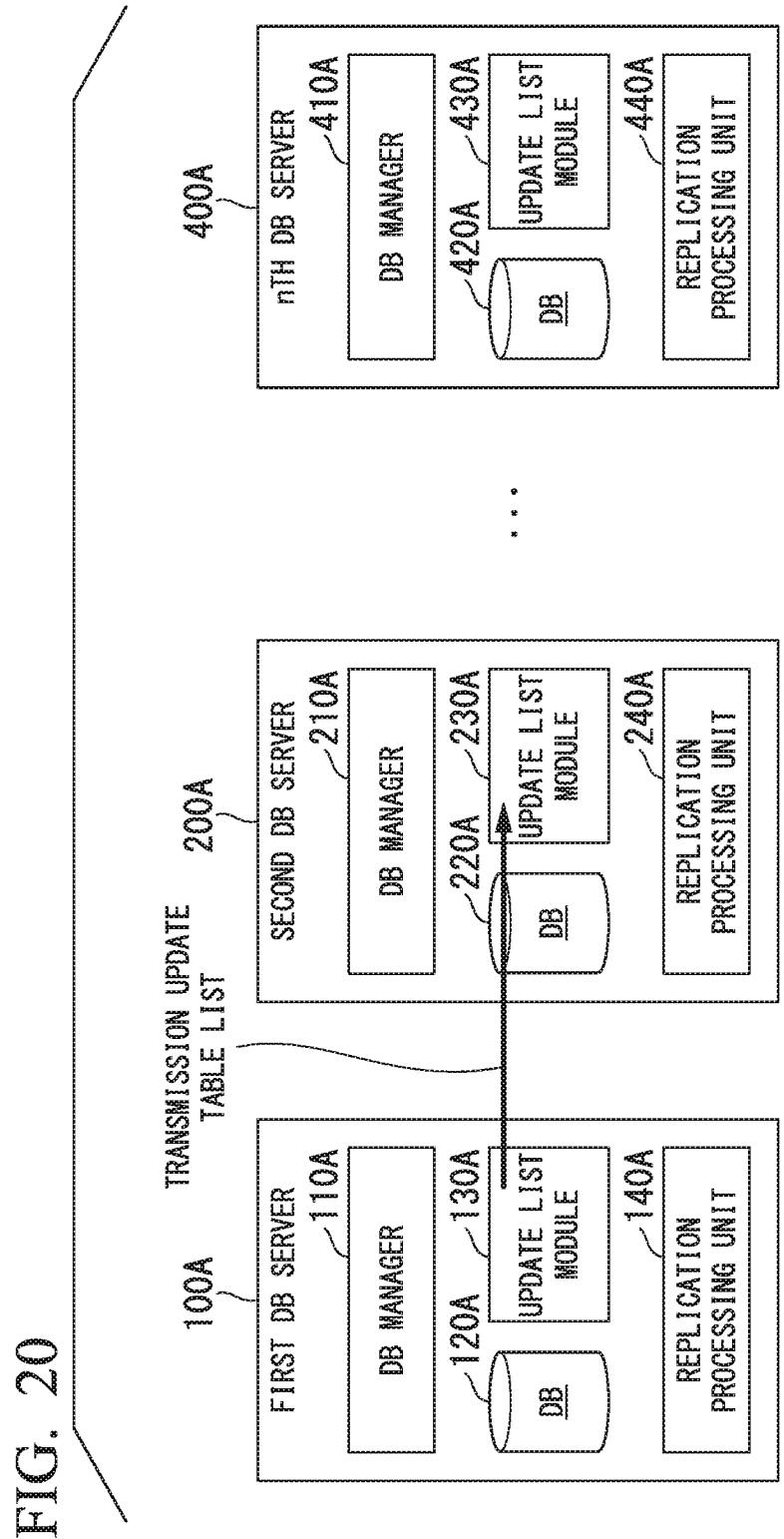
FIG. 20 is a diagram showing a situation where switchover has started in the database system 2.
Figure 21:
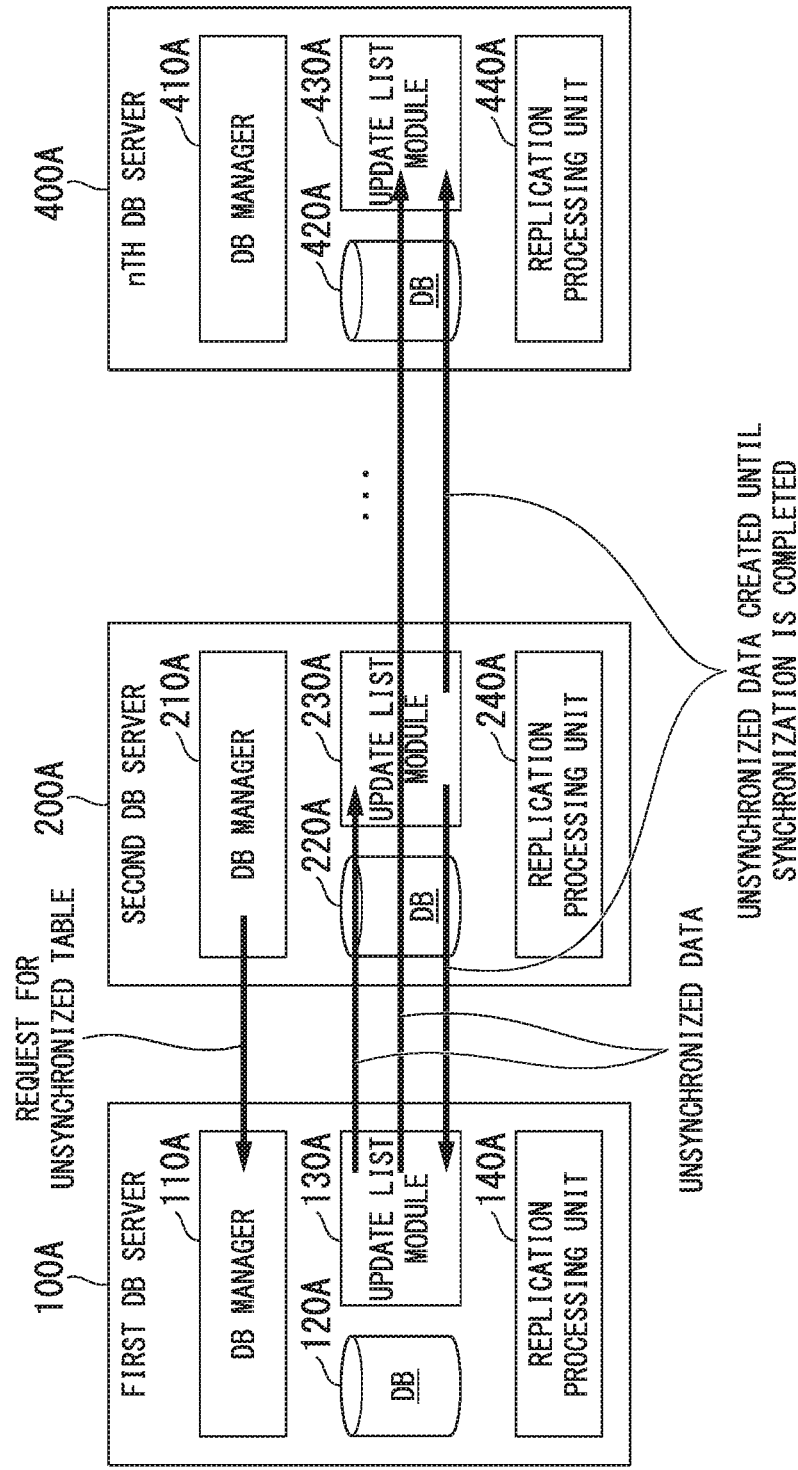
FIG. 21 is a diagram showing a situation after switchover is completed in the database system 2.

In the following description, it is assumed that the first DB server 100A is an old master DB, the second DB server 200A is a new master DB, and the nth DB server 400A is a slave DB before and after switchover. FIG. 20 is a diagram showing a situation where switchover has started in the database system 2. When switchover starts, the first DB server 100A transmits a transmission update table list to the second DB server 200A. FIG. 21 is a diagram showing a situation after switchover is completed in the database system 2. As shown, the DB manager 210A transfers a request for an unsynchronized table to the first DB server 100A. The replication processing unit 140A transmits unsynchronized data (update data) registered in the update list module 130A to the second DB server 200A and the nth DB server 400A. After the switchover is completed, the replication processing unit 240A transmits unsynchronized data created until synchronization is completed to the first DB server 100A and the nth DB server 400A. This realizes the same switchover as when two DB servers are provided.

According to at least one embodiment described above, a database server includes a database manager configured to update a database in accordance with a request from a client and to register both update data for causing another database server included in the plurality of database servers to update a database of the other database server and management information of the update data for each data management unit in a memory on the basis of the request when the database server is in a first state in which the database server receives requests from the client, and a synchronization processing unit configured to transmit the update data registered in the memory to the other database server when the database server is in the first state, wherein the synchronization processing unit is configured to transmit the management information registered in the memory to the other database server when the database server shifts from the first state to a second state in accordance with a role change instruction, the synchronization processing unit is configured to transmit update data registered in the memory to the other database server when the database server is in the second state, and the synchronization processing unit is configured to update the database on the basis of update data received from another database server included in the plurality of database servers when the database server is in a third state to which the database server shifts from the second state. This makes it possible to respond to the client more quickly when switchover is performed.

In the embodiments described above, the replication processing unit performs processing in both the normal and switchover times. However, the database system may include a functional unit that is not activated in the normal time, but is activated in the switchover time to perform the same processing as the replication processing unit. In the former case, the replication processing unit is an example of the "synchronization processing unit," and in the latter case, a combination of the replication processing unit and the functional unit is an example of the "synchronization processing unit."

Further, a state in which the database server is a master DB corresponds to the first state, a state in which the database server has switched from the master DB to a slave DB until switchover is completed corresponds to the second state, a state in which the database server is the slave DB corresponds to the third state, and a state in which the database server has switched from the slave DB to the master DB until switchover is completed corresponds to the fourth state.

While some embodiments of the present invention have been described, these embodiments have been presented by way of example and are not intended to limit the scope of the invention. These embodiments can be implemented in various other forms, and various omissions, substitutions, and changes can be made without departing from the spirit of the invention. These embodiments and modifications thereof are included in the scope or spirit of the invention, as well as in the scope of the invention described in the claims and their equivalents.

What is claimed is:

1. A database server included in a database system including a plurality of database servers, the database server comprising processing circuitry configured to execute a program stored in a storage medium to implement:
    a database manager configured to update a database in accordance with a request from a client and to register both update data for causing an other database server included in the plurality of database servers to update an other database of the other database server and management information of the update data for each data management unit in a memory based on the request, when the database server is in a first state in which the database server receives requests from the client; and
    a synchronization processing unit configured to transmit the update data registered in the memory to the other database server when the database server is in the first state,
    wherein the synchronization processing unit is further configured to transmit the management information registered in the memory to a first database server in the plurality of database servers when the database server shifts from the first state to a second state in accordance with a role change instruction,
    the synchronization processing unit is further configured to transmit update data registered in the memory to the other database server when the database server is in the second state,
    the synchronization processing unit is further configured to update the database based on update data received from the first database server when the database server is in a third state to which the database server shills from the second state, and
    the database manager is further configured to update the database based on a request received from the first database server and trot to update the update data and the management information when the database server s in the second state,
    wherein, when the database server is in a switchover process of switching to a fourth state from the third state in accordance with the role change instruction, the database manager s further configured to refer to the management information received from a second database server included in the plurality of database servers to determine whether or not the request from the client is a request relating to a management unit that has been updated in a database of the second database server and has not been updated in the database of the database server, and (1) transmit information based on the request from the client, to the second database server, when determining that the request from the client is a request relating to a management unit that has been updated in the database of the second database server and has not been updated in the database of the database server, and then (2) register the update data, based on the request relating to a management unit that has been updated in the database of the second database server and has not been updated in the database of the database server, in the memory, and
    the database manager or the synchronization processing unit is further configured to receive the update data relating to the management unit that has been updated in the database of the second database server and has not been updated in the database of the database server from the second database server, and to update the database of the database server and then to cause the update data registered in the memory to be reflected in the database of the database server.

2. A database server included in a database system including a plurality of database servers, the database server comprising processing circuitry configured to execute a program stored in a storage medium to implement:
    a synchronization processing unit configured to update a database based on update data received from a first database server included in the plurality of database servers when the database server is in a third state in which the database server receives no requests from a client; and
    a database manager configured to, when the database server is in a switchover process of switching to a fourth state from the third state in accordance with a role change instruction, refer to management information received from a second database server included in the plurality of database servers to determine whether or not a request from the client is a request relating to a management unit which has been updated in a database of the second database server and has not been updated in the database of the database server, and (1) transmit information based on the request from the client, to the second database server, when determining that the request from the client is a request relating to a management unit that has been updated in the database of the second database server and has not been updated in the database of the database server, and then (2) register the update data, based on the request relating to a management unit that has been updated in the database of the second database server and has not been updated in the database of the database server, in the memory, and the database manager or the synchronization unit is further configured to receive the update data relating to the management unit that has been updated in the database of the second database server and has not been updated in the database of the database server from the second database server, and to update the database of the database server and then to cause the update data registered in the memory to be reflected in the database of the database server.

3. A database management method for a database server included in a database system including a plurality of database servers, the method being performed by processing circuitry of the database server and comprising:

the database server updating, when the database server is in a first state in which the database server receives requests from a client, a database in accordance with a request from the client, registering both update data for causing an other database server included in the plurality of database servers to update an other database of the other database server and management information of the update data for each data management unit in a memory based on the request, and transmitting the update data registered in the memory to the other database server;

transmitting the management information registered in the memory to a first database server in the plurality of database servers when the database server shifts from the first state to a second state in accordance with a role change instruction;

transmitting update data registered in the memory to the other database server, updating the database based on a request received from the first database server, and not updating the update data and the management information when the database server is in the second state;

updating the database based on update data received from the first database server when the database server is in a third state to which the database server shifts from the second state, referring to, when the database server is in a switchover process of switching to a fourth state from the third state in accordance with the role change instruction, the management information received from a second database server included in the plurality of database servers to determine whether or not the request from the client is a request relating to a management unit that has been updated in a database of the second database server and has not been updated in the database of the database server, and (1) transmitting information based on the request from the client, to the second database server, when determining that the request from the client is a request relating to a management unit that has been updated in the database of the second database server and has not been updated in the database of the database server, and then (2) registering the update data, based on the request relating to a management unit that has been updated in the database of the second database server and has not been updated in the database of the database server, in the memory; and receiving the update data relating to the management unit that has been updated in the database of the second database server and has not been updated in the database of the database server from the second database server and updating the database of the database server and then causing the update data registered in the memory to be reflected in the database of the database server.

4. A database management method for a database server included in a database system including a plurality of database servers, the method being performed by processing circuitry of the database server and comprising:

the database server updating a database based on update data received from a first database server included in the plurality of database servers when the database server is in a third state in which the database server receives no requests from a client;

referring to, when the database server is in a switchover process of switching to a fourth state from the third state in accordance with a role change instruction, management information received from a second database server included in the plurality of database servers to determine whether or not a request from the client is a request relating to a management unit that has been updated in a database of the second database server and has not been updated in the database of the database server, and (1) transmitting information based on the request from the client, to the second database server, when determining that the request from the client is a request relating to a management unit that has been updated in the database of the second database server and has not been updated in the database of the database server, and their (2) registering the update data, based on a request relating to a management unit that has been updated in the database of the second database server and has not been updated in the database of the database server, in the memory; and receiving the update data relating to the management unit that has been updated in the database of the second database server and has not been updated in the database of the database server from the second database server, and updating the database of the database server and then causing the update data registered in the memory to be reflected in the database of the database server.

5. A non-transitory computer-readable storage medium storing a program causing a database server included in a database system including a plurality of database servers to:

update, when the database server is in a first state in which the database server receives requests from a client, a database in accordance with a request from the client, register both update data for causing an other database server included in the plurality of database servers to update an other database of the other database server and management information of the update data for each data management unit in a memory based on the request, and transmit the update data registered in the memory- to the other database server;

transmit the management information registered in the memory to a first database server in the plurality of database servers when the database server shifts from the first state to a second state in accordance with a role change instruction;

transmit the update data registered in the memory to the other database server, update the database based on a request received from the first database server, and not update the update data and the management information when the database server is in the second state;

update the database based on update data received from another database server included in the plurality of database servers when the database server is in a third state to which the database server shifts from the second state, refer to, when the database server is in a switchover process of switching to a fourth state from the third state in accordance with the role change instruction, the management information received from a second database server included in the plurality of database servers to determine whether or not the request from the client is a request relating to a management unit that has been updated in a database of the second database server and has not been updated in the database of the database server, and (1) transmit information based on the request from the client, to the second database server, when determining that the request from the client is a request relating to a management unit that has been updated in the database of the second database server and has not been updated in the database of the database server, and then (2) register the update data, based on the request relating to a management unit that has been updated in the database of the second database server and has not been updated in the database of the database server, in the memory, and receive the update data relating to the management unit that has been updated in the database of the second database server and has not been updated in the database of the database server from the second database server, and update the database of the database server and then cause the update data registered in the memory to be reflected in the database of the database server.

6. A non-transitory computer-readable storage medium storing a program causing a database server included in a database system including a plurality of database servers to:

update a database based on update data received from a first database server included in the plurality of database servers when the database server is in a third state in which the database server receives no requests from a client;

refer to, when the database server is in a switchover process of switching to a fourth state from the third state in accordance with a role change instruction, management information received from a second database server included in the plurality of database servers to determine whether or not a request from the client is a request relating to a management unit that has been updated in a database of the first database server and has not been updated in the database of the database server, and (1) transmit information based on the request from the client, to the second database server, when determining that the request from the client is a request relating to a management unit that has been updated in the database of the second database server and has not been updated in the database of the database server, and then (2) register the update data, based on the request relating to a management unit that has been updated in the database of the second database server and has not been updated in the database of the database server, in the memory, and receive the update data relating to the management unit that has been updated in the database of the second database server and has not been updated in the database of the database server from the second database server, and update the database of the database server and then cause the update data registered in the memory to be reflected in the database of the database server.

* * * * *